(12) United States Patent
Yasui

(10) Patent No.: US 12,304,527 B2
(45) Date of Patent: May 20, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 431 days.

(21) Appl. No.: 17/211,878

(22) Filed: Mar. 25, 2021

(65) Prior Publication Data

US 2021/0300348 A1    Sep. 30, 2021

(30) Foreign Application Priority Data

Mar. 31, 2020    (JP) ................................. 2020-063501

(51) Int. Cl.
*B60W 60/00*    (2020.01)
*B60W 30/09*    (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 2554/4049;
(Continued)

(56) References Cited

U.S. PATENT DOCUMENTS

| 8,503,729 B2 * | 8/2013 | Kumagai | ................. G06T 7/55 701/1 |
| 10,156,850 B1 * | 12/2018 | Ansari | .............. B60W 30/0953 |

(Continued)

FOREIGN PATENT DOCUMENTS

| CN | 110121449 | 8/2019 |
| JP | 2017-224168 | 12/2017 |

(Continued)

OTHER PUBLICATIONS

Japanese Office Action for Japanese Patent Application No. 2020-063501 mailed Sep. 26, 2023.
(Continued)

*Primary Examiner* — Tyler J Lee
(74) *Attorney, Agent, or Firm* — Amin, Turocy & Watson, LLP

(57) ABSTRACT

Provided is a vehicle control device including: a recognition unit configured to recognize an object which is located near a vehicle; a calculation unit configured to calculate an area of risk which is distributed around the object; a generation unit configured to generate a target trajectory for the vehicle to travel along on the basis of the area; and a driving control unit configured to automatically control at least one of a speed or steering of the vehicle on the basis of the target trajectory, wherein the generation unit selects one or a plurality of models from a plurality of models that output the target trajectory in a case where the area is input, inputs the area calculated by the calculation unit to the selected model, and generates the target trajectory on the basis of an output result of the model to which the area is input, and the calculation unit changes a range of the area in accordance with a type of model selected by the generation unit.

9 Claims, 17 Drawing Sheets

(51) Int. Cl.
  *B60W 30/095*  (2012.01)
  *G06N 20/00*  (2019.01)
  *G06V 10/764*  (2022.01)
  *G06V 10/82*  (2022.01)
  *G06V 20/56*  (2022.01)
  *G06V 20/58*  (2022.01)
  *G06V 20/59*  (2022.01)
  *G06V 40/19*  (2022.01)

(52) U.S. Cl.
  CPC ........... *G06N 20/00* (2019.01); *G06V 10/764* (2022.01); *G06V 10/82* (2022.01); *G06V 20/58* (2022.01); *G06V 20/588* (2022.01); *G06V 20/597* (2022.01); *G06V 40/19* (2022.01); *B60W 2554/4049* (2020.02)

(58) Field of Classification Search
  CPC ..... B60W 2050/0095; B60W 2552/05; B60W 2710/207; B60W 2720/10; B60W 60/001; B60W 60/0027; G06N 20/00; G06N 3/044; G06N 3/045; G06N 3/048; G06N 3/042; G06N 3/08; G06V 10/764; G06V 10/82; G06V 20/58; G06V 20/588; G06V 20/597; G06V 40/19; G08G 1/167; G08G 1/166
  See application file for complete search history.

(56) References Cited

U.S. PATENT DOCUMENTS

| | | | |
|---|---|---|---|
| 10,235,882 B1 | 3/2019 | Aoude et al. | |
| 10,913,392 B2 * | 2/2021 | Morimura | B60W 30/095 |
| 11,192,499 B2 * | 12/2021 | Kang | B60W 40/02 |
| 2015/0203126 A1 * | 7/2015 | Kobana | B60W 50/12 701/1 |
| 2016/0272199 A1 | 9/2016 | Kawahara et al. | |
| 2017/0026618 A1 * | 1/2017 | Mitsuta | H04N 23/90 |
| 2017/0225617 A1 * | 8/2017 | Morimura | G06V 40/10 |
| 2018/0032824 A1 * | 2/2018 | Yamamoto | B60R 1/23 |
| 2018/0154899 A1 | 6/2018 | Tiwari et al. | |
| 2018/0208141 A1 * | 7/2018 | Mase | B60R 21/0134 |
| 2018/0297520 A1 * | 10/2018 | Morimura | B60Q 9/008 |
| 2018/0348770 A1 | 12/2018 | Yasui | |
| 2019/0113927 A1 * | 4/2019 | England | G06N 5/046 |
| 2019/0135279 A1 | 5/2019 | Irie et al. | |
| 2019/0146509 A1 | 5/2019 | Dean et al. | |
| 2019/0180502 A1 * | 6/2019 | England | G01S 7/417 |
| 2019/0329766 A1 | 10/2019 | Ishioka | |
| 2019/0347371 A1 * | 11/2019 | Sankar | G06Q 10/06312 |
| 2020/0019175 A1 * | 1/2020 | Dean | G06N 7/01 |
| 2021/0300415 A1 | 9/2021 | Yasui | |

FOREIGN PATENT DOCUMENTS

| | | |
|---|---|---|
| JP | 2018-058588 | 4/2018 |
| JP | 2018-192954 | 12/2018 |
| JP | 2018-203034 | 12/2018 |
| JP | 2019-108124 | 7/2019 |
| JP | 2021-160494 | 10/2021 |

OTHER PUBLICATIONS

Chinese Office Action for Chinese Patent Application No. 202110337193.X mailed Nov. 4, 2023.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-063501, filed Mar. 31, 2020, the content of which is incorporated herein by reference.

BACKGROUND OF THE INVENTION

Field of the Invention

The present invention relates to a vehicle control device, a vehicle control method, and a storage medium.

Description of Related Art

A technique of generating a target trajectory for a vehicle to travel in the future is known (see, for example, Japanese Unexamined Patent Application, First Publication No. 2019-108124).

SUMMARY OF THE INVENTION

However, in the related art, a target trajectory that is not suitable for a peripheral situation in which a vehicle is stuck may be generated. As a result, driving of a vehicle may not be able to be smoothly controlled.

The present invention was contrived in view of such circumstances, and one object thereof is to provide a vehicle control device, a vehicle control method, and a storage medium that make it possible to smoothly control driving of a vehicle by generating a target trajectory that is suitable for a peripheral situation.

In order to solve the above problem and achieve such an object, the present invention adopts the following aspects.

According to a first aspect of the present invention, there is provided a vehicle control device including: a recognition unit configured to recognize an object which is located near a vehicle; a calculation unit configured to calculate an area of risk which is distributed around the object recognized by the recognition unit; a generation unit configured to generate a target trajectory for the vehicle to travel along on the basis of the area calculated by the calculation unit; and a driving control unit configured to automatically control at least one of a speed or steering of the vehicle on the basis of the target trajectory generated by the generation unit, wherein the generation unit selects one or a plurality of models from a plurality of models that output the target trajectory in a case where the area is input, inputs the area calculated by the calculation unit to the selected model, and generates the target trajectory on the basis of an output result of the model to which the area is input, and the calculation unit changes a range of the area in accordance with a type of model selected by the generation unit.

According to a second aspect, in the first aspect, the plurality of models may include at least one first model which is rule-based or model-based and at least one second model which is machine-learning-based.

According to a third aspect, in the second aspect, in a case where the model selected by the generation unit is the first model, the calculation unit may make the range of the area greater than in a case where the model selected by the generation unit is the second model.

According to a fourth aspect, in the third aspect, the generation unit may select any one model from the plurality of models in accordance with a type of road on which the vehicle travels.

According to a fifth aspect, in the fourth aspect, the generation unit may select the first model in a case where the vehicle travels on an expressway, and select the second model in a case where the vehicle travels on another road of which a surrounding situation is more complicated than an expressway.

According to a sixth aspect, in the third or fourth aspect, the generation unit may select any one model from the plurality of models in accordance with a level of automation when at least one of the speed or steering of the vehicle is automatically controlled by the driving control unit.

According to a seventh aspect, in the sixth aspect, the generation unit may select the first model in a case where the level is equal to or higher than a reference value, and select the second model in a case where the level is lower than the reference value.

According to an eighth aspect, in any one of the first to seventh aspects, the generation unit may input the area to each of the plurality of models, generate a plurality of target trajectories on the basis of an output result of each of the plurality of models to which the area is input, and select the target trajectory closest to a trajectory when a person drives the vehicle or another vehicle from the plurality of generated target trajectories, and the driving control unit may control at least one of the speed or steering of the vehicle on the basis of the target trajectory selected by the generation unit.

According to a ninth aspect, in any one of the first to eighth aspects, the area may be an area partitioned by a plurality of meshes, a potential of the risk calculated on the basis of a state of at least one of the vehicle or the object may be associated with each of the plurality of meshes, the potential associated with each of the plurality of meshes may be normalized on the basis of potentials of all meshes included in the area, and the generation unit may generate a trajectory passing through the mesh of which the normalized potential is lower than a threshold as the target trajectory.

According to a tenth aspect, there is provided a vehicle control method including causing a computer mounted in a vehicle to: recognize an object which is located near the vehicle; calculate an area of risk which is distributed around the recognized object; generate a target trajectory for the vehicle to travel along on the basis of the calculated area; control at least one of a speed or steering of the vehicle on the basis of the generated target trajectory; select one or a plurality of models from a plurality of models that output the target trajectory in a case where the area is input, input the calculated area to the selected model, and generate the target trajectory on the basis of an output result of the model to which the area is input; and change a range of the area in accordance with a type of the selected model.

According to an eleventh aspect, there is provided a computer readable non-transitory storage medium having a program stored therein, the program causing a computer mounted in a vehicle to execute: recognizing an object which is located near the vehicle; calculating an area of risk which is distributed around the recognized object; generating a target trajectory for the vehicle to travel along on the basis of the calculated area; controlling at least one of a speed or steering of the vehicle on the basis of the generated target trajectory; selecting one or a plurality of models from a plurality of models that output the target trajectory in a case where the area is input, inputting the calculated area to the selected model, and generating the target trajectory on the basis of an output result of the model to which the area is input; and changing a range of the area in accordance with a type of the selected model.

According to any of the aspects, it is possible to smoothly control driving of a vehicle by generating a target trajectory that is suitable for a peripheral situation.

DETAILED DESCRIPTION OF THE INVENTION

Hereinafter, an embodiment of a vehicle control device, a vehicle control method, and a storage medium of the present invention will be described with reference to the accompanying drawings. The vehicle control device of the embodiment is applied to, for example, an automated driving vehicle. The term "automated driving" refers to, for example, controlling one or both of the speed or steering of a vehicle and controlling driving of the vehicle. Examples of the above-described vehicle driving control include various driving control such as an adaptive cruise control system (ACC), a traffic jam pilot (TJP), auto lane changing (ALC), a collision mitigation brake system (CMBS), or a lane keeping assistance system (LKAS). Driving of the automated driving vehicle may be controlled by manual driving of an occupant (a driver).

First Embodiment

[Overall Configuration]

Figure 1:
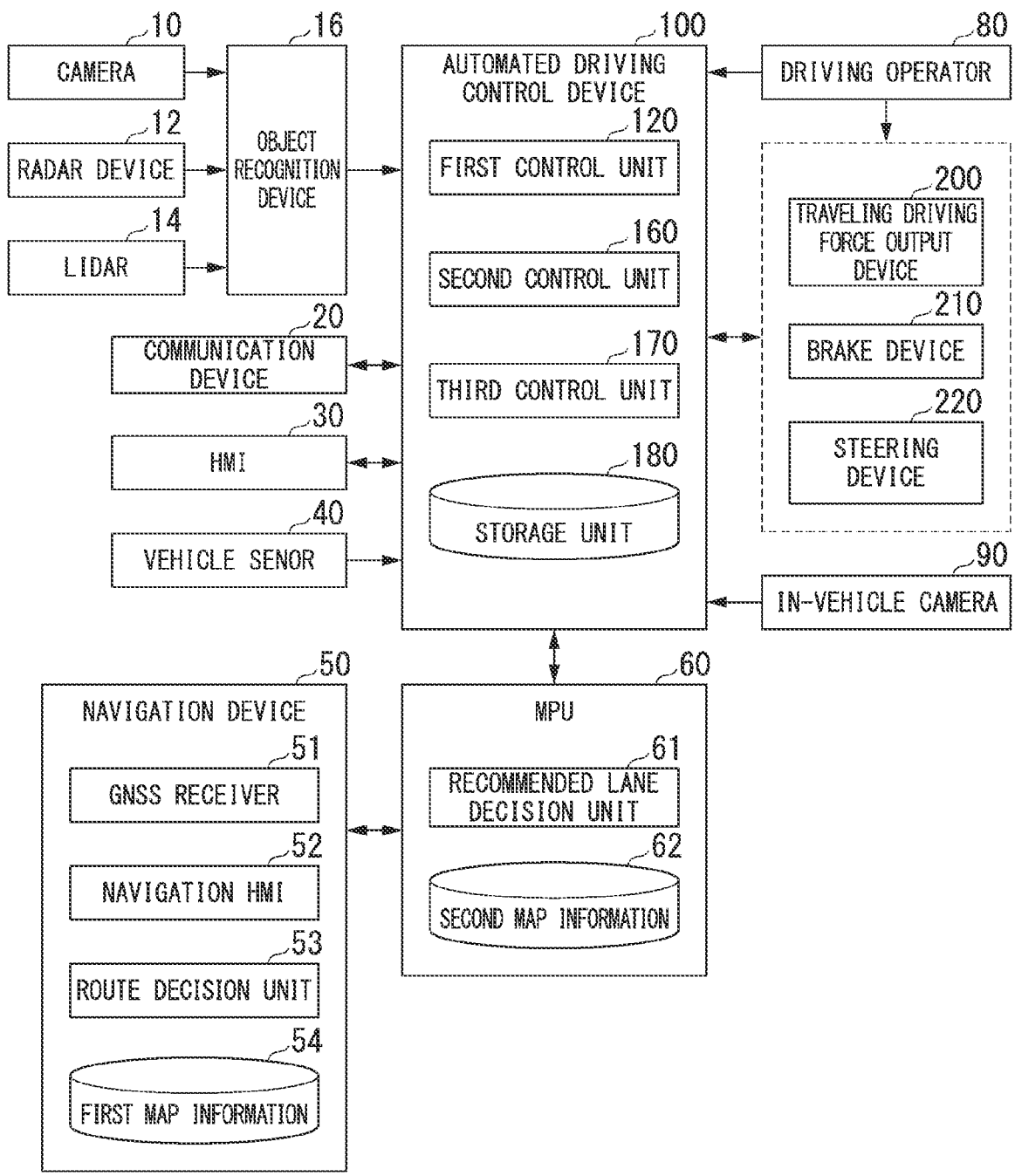
FIG. 1 is a configuration diagram of a vehicle system in which a vehicle control device according to a first embodiment is used.

FIG. 1 is a configuration diagram of a vehicle system 1 in which a vehicle control device according to a first embodiment is used. A vehicle having the vehicle system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle senor 40, a navigation device 50, a map positioning unit (MPU) 60, a driving operator 80, an in-vehicle camera 90, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. The automated driving control device 100 is an example of a "vehicle control device."

The camera 10 is a digital camera using a solid-state imaging element such as, for example, a charge coupled device (CCD) or a complementary metal oxide semiconductor (CMOS). The camera 10 is installed at any point on the host vehicle M. For example, in a case where a forward image of the host vehicle M is captured, the camera 10 is installed on the upper portion of the front windshield, the rear surface of the rear-view mirror, or the like. In a case where a rearward image of the host vehicle M is captured, the camera 10 is installed on the upper portion of the rear windshield or the like. In a case where a rightward or leftward image of the host vehicle M is captured, the camera 10 is installed on the right side, left side or the like of the car body or the side mirror. The camera 10, for example, repeatedly captures an image of the vicinity of the host vehicle M periodically. The camera 10 may be a stereo camera.

The radar device 12 radiates radio waves such as millimeterwaves to the vicinity of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The LIDAR 14 irradiates the vicinity of the host vehicle M with light, and measures scattered light of the irradiation light. The LIDAR 14 detects a distance to an object on the basis of a time from light emission to light reception. The irradiation light may be, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14. The object recognition device 16 outputs a recognition result to the automated driving control device 100. The object recognition device 16 may output the detection results of the camera 10, the radar device 12, and the LIDAR 14, as they are, to the automated driving control device 100. In this case, the object recognition device 16 may be omitted from the vehicle system 1.

The communication device 20 communicates with another vehicle which is located near the host vehicle M using, for example, a cellular network, a Wi-Fi network, Bluetooth (registered trademark), dedicated short range communication (DSRC), or the like, or communicates with various types of server devices through a wireless base station.

The HMI 30 presents various types of information to an occupant (including a driver) of the host vehicle M, and accepts the occupant's input operation. The HMI 30 may include, for example, a display, a speaker, a buzzer, a touch panel, a microphone, a switch, a key, or the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route decision unit 53. The navigation device 50 has first map information 54 held in a storage device such as a hard disk drive (HDD) or a flash memory.

The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used.

The navigation HMI 52 includes a display device, a speaker, a touch panel, a key, and the like. A portion or the entirety of the navigation HMI 52 may be shared with the above-described HMI 30. For example, an occupant may input a destination of the host vehicle M to the navigation HMI 52 instead of or in addition to inputting the destination of the host vehicle M to the HMI 30.

The route decision unit 53 decides, for example, a route (hereinafter, a route on a map) from the position (or any input position) of the host vehicle M specified by the GNSS receiver 51 to a destination input by an occupant using the HMI 30 or the navigation HMI 52 with reference to the first map information 54.

The first map information 54 is, for example, information in which a road shape is represented by a link indicating a road and nodes connected by the link. The first map information 54 may include the curvature of a road, point of interest (POI) information, or the like. The route on a map is output to the MPU 60.

The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane decision unit 61, and holds second map information 62 in a storage device such as an HDD or a flash memory. The recommended lane decision unit 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decision unit 61 makes a decision on which lane from the left to travel along. In a case where a divergence point is present in the route on a map, the recommended lane decision unit 61 decides a recommended lane so that the host vehicle M can travel along a rational route for advancing to a divergence destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

For example, a senor attached to a steering wheel (hereinafter referred to as a steering senor) detects a weak electrical current generated by an occupant touching the steering wheel. The steering senor may detect a steering torque generated around the rotating shaft (shaft) of the steering wheel. In a case where an electrical current or a steering torque is detected, the steering senor outputs a signal indicating the detection result to the automated driving control device 100.

The in-vehicle camera 90 is a camera that captures an image of the interior of the host vehicle M. The in-vehicle camera 90 is a digital camera using a solid-state imaging element such as, for example, a CCD or a CMOS. In a case where an image of the interior of the host vehicle M is captured, the in-vehicle camera 90 outputs image data to the automated driving control device 100.

The automated driving control device 100 includes, for example, a first control unit 120, a second control unit 160, a third control unit 170, and a storage unit 180. The first control unit 120, the second control unit 160, and the third control unit 170 are each realized by a hardware processor such as, for example, a central processing unit (CPU) or a graphics processing unit (GPU) executing a program (software). Some or all of these components may be realized by hardware (a circuit unit; including circuitry) such as a large scale integration (LSI), an application specific integrated circuit (ASIC), or a field-programmable gate array (FPGA), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device.

The storage unit 180 is realized by various types of storage devices described above. The storage unit 180 is realized by, for example, an HDD, a flash memory, an electrically erasable programmable read only memory (EE-PROM), a read only memory (ROM), a random access memory (RAM), or the like. The storage unit 180 stores, for example, rule-based model data 182, deep neural network(s) (DNN) model data 184, or the like in addition to a program which is read out and executed by a processor. The details of the rule-based model data 182 and the DNN model data 184 will be described later.

Figure 2:
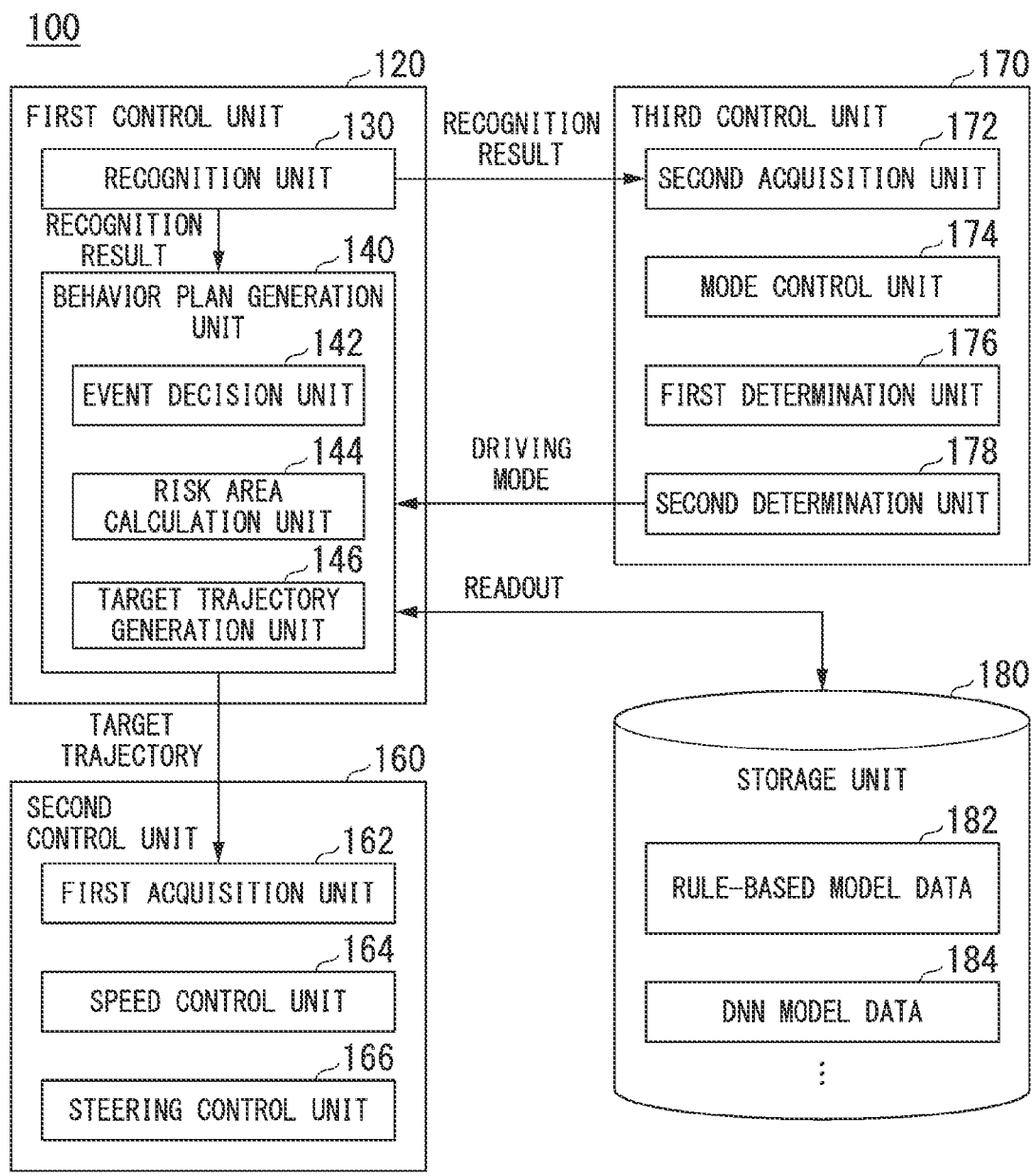
FIG. 2 is a functional configuration diagram of a first control unit, a second control unit, a third control unit, and a storage unit according to the first embodiment.

FIG. 2 is a functional configuration diagram of the first control unit 120, the second control unit 160, the third control unit 170, and the storage unit 180 according to the first embodiment. The first control unit 120 includes, for example, a recognition unit 130 and a behavior plan generation unit 140.

The first control unit 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and performing comprehensive evaluation by performing scoring on both. Thereby, the reliability of automated driving is secured.

The recognition unit 130 recognizes the peripheral situation or environment of the host vehicle M. For example, the recognition unit 130 recognizes an object which is located near the host vehicle M on the basis of information which is input from the camera 10, the radar device 12, and the LIDAR 14 through the object recognition device 16. Examples of the object recognized by the recognition unit 130 include a bicycle, an autobike, a four-wheeled automobile, a pedestrian, a road mark, a road sign, a partition line, a telephone pole, a guardrail, a fallen object, and the like. The recognition unit 130 recognizes the state of the position, speed, acceleration or the like of an object. The position of the object is recognized as, for example, a position in relative coordinates (that is, a relative position with respect to the host vehicle M) with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognition unit 130 recognizes, for example, a lane (hereinafter referred to as a host lane) in which the host vehicle M is traveling, an adjacent lane which is adjacent to the host lane, or the like. For example, the recognition unit 130 recognizes the host lane, the adjacent lane, or the like by comparing a pattern of a road partition line (for example, an array of solid lines and broken lines) obtained from the second map information 62 with a pattern of a road partition line located in the vicinity of the host vehicle M which is recognized from an image captured by the camera 10.

The recognition unit 130 is not limited to the road partition line, and may recognize lanes such as the host lane or the adjacent lane by recognizing a driving boundary (road boundary) including a road partition line, a shoulder, a curbstone, a median strip, a guardrail, or the like. In this recognition, the position of the host vehicle M acquired from the navigation device 50 or processing results based on an INS may be added. The recognition unit 130 may recognize a stop line, an obstacle, a red light, a tollbooth, and other road events.

Upon recognizing a host lane, the recognition unit 130 recognizes the relative position or posture of the host vehicle M with respect to the host lane. The recognition unit 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the host lane. Instead, the recognition unit 130 may recognize the position of the reference point of the host vehicle M or the like with respect to either lateral end portion (a road partition line or a road boundary) of the host lane as the relative position of the host vehicle M with respect to the host lane.

The behavior plan generation unit 140 includes, for example, an event decision unit 142, a risk area calculation unit 144, and a target trajectory generation unit 146.

In a case where the host vehicle M is performing automated driving along a route on which a recommended lane is decided, the event decision unit 142 decides a traveling mode of the automated driving. In the following description, information in which a traveling mode of automated driving is specified is referred to as an event.

Examples of the event include a constant-speed traveling event, a following traveling event, a lane change event, a divergence event, a merging event, an overtaking event, and the like. The constant-speed traveling event is a traveling mode of causing the host vehicle M to travel in the same lane at a constant speed. The following traveling event is a traveling mode of causing the host vehicle M to follow another vehicle (hereinafter referred to as a preceding vehicle) which is present within a predetermined distance (within, for example, 100 [m]) in front of the host vehicle M in the host lane and is closest to the host vehicle M.

The term "following" may be, for example, a traveling mode of maintaining a constant inter-vehicle distance (relative distance) between the host vehicle M and the preceding vehicle, or may be a traveling mode of causing the host vehicle M to travel in the center of the host lane in addition to maintaining a constant inter-vehicle distance between the host vehicle M and the preceding vehicle.

The lane change event is a traveling mode of changing the lane of the host vehicle M from the host lane to the adjacent lane. The divergence event is a traveling mode of causing the host vehicle M to diverge to a lane on the destination side at a divergence point of a road. The merging event is a traveling mode of causing the host vehicle M to merge into a main line at a merging point. The overtaking event is a traveling mode of terminating automated driving and switching to manual driving.

The event may include, for example, a passing event, an avoidance event, or the like. The passing event is a traveling mode of temporarily changing the lane of the host vehicle M to the adjacent lane, passing the preceding vehicle in the adjacent lane, and then changing the lane to the original lane again. The avoidance event is a traveling mode of causing the host vehicle M to perform at least one of braking and steering in order to avoid an obstacle which is present in front of the host vehicle M.

The event decision unit 142 may change, for example, an event already decided with respect to the current section to another event in accordance with a peripheral situation recognized by the recognition unit 130 during traveling of the host vehicle M, or may decide a new event with respect to the current section.

The risk area calculation unit 144 calculates an area of risk (hereinafter referred to as a risk area RA) which is potentially distributed or potentially present around an object recognized by the recognition unit 130. The risk is, for example, a risk that an object exerts on the host vehicle M. More specifically, the risk may be a risk of forcing the host vehicle M into sudden braking because the preceding vehicle suddenly decelerates or another vehicle interrupts in front of the host vehicle M from the adjacent lane, or may be a risk of forcing the host vehicle M into sudden steering because a pedestrian or a bicycle enters a roadway. The risk may be a risk that the host vehicle M exerts on an object. In the following description, such a high risk will be handled as a quantitative index value, and the index value will be referred to as a "risk potential p."

Figure 3:
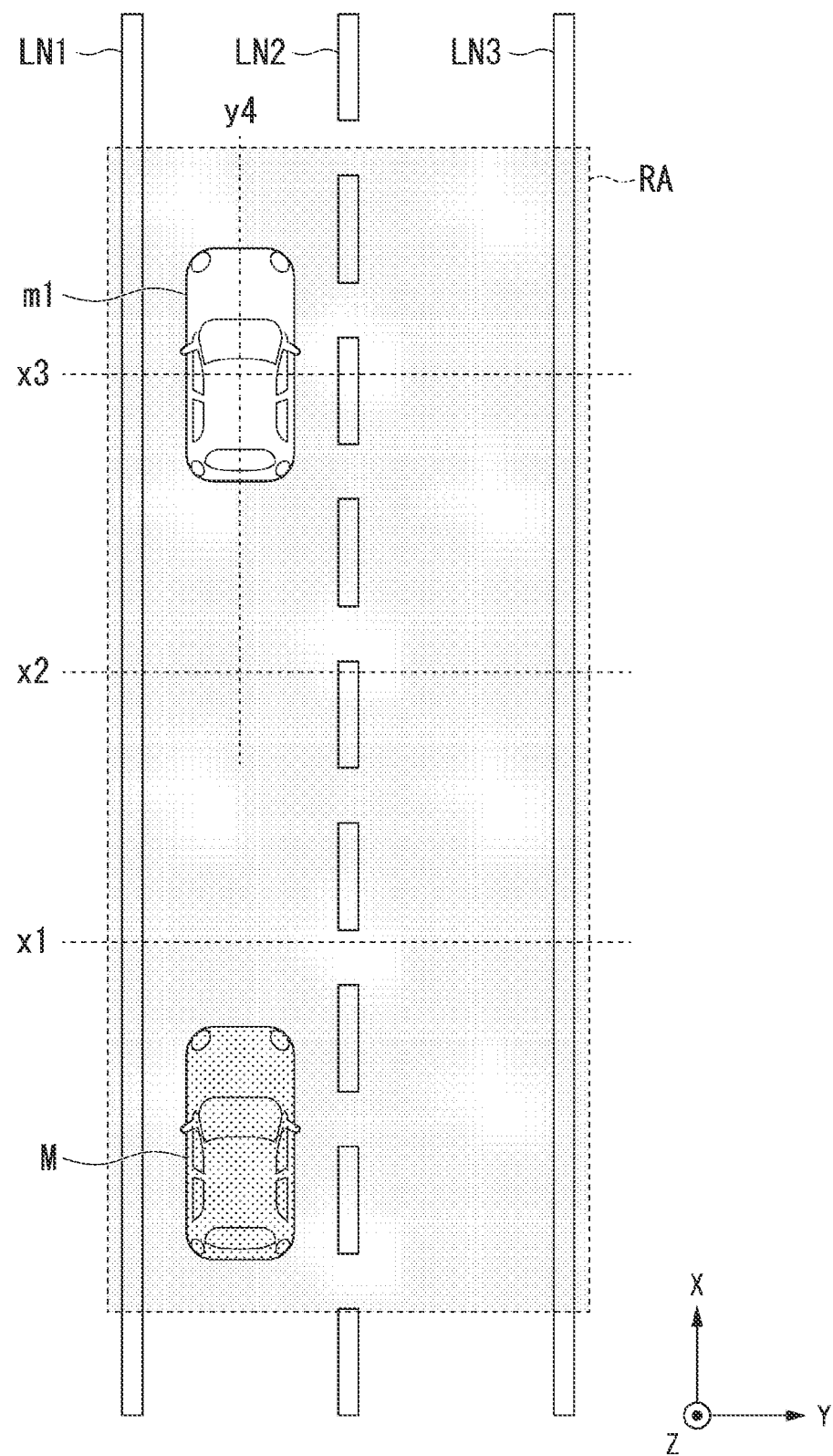
FIG. 3 is a diagram illustrating a risk area.

FIG. 3 is a diagram illustrating the risk area RA. In the drawing, LN1 represents one partition line for partitioning the host lane, and LN2 represents the other partition line for partitioning the host lane and one partition line for partitioning an adjacent lane. LN3 represents the other partition line for partitioning an adjacent lane. Among these plurality of partition lines, LN1 and LN3 represent roadway outside lines, and LN2 represents a center line where a vehicle is allowed to overtake for passing. In the shown example, there is a preceding vehicle m1 in front of the host vehicle M in the host lane. In the drawing, X represents the traveling direction of the vehicle, Y represents the width direction of the vehicle, and Z represents a vertical direction.

In the case of the shown situation, in the risk area RA, the risk area calculation unit 144 increases the risk potential p as an area becomes closer to the roadway outside lines LN1 and LN3, and decreases the risk potential p as an area becomes farther from the roadway outside lines LN1 and LN3.

In the risk area RA, the risk area calculation unit 144 increases the risk potential p as an area becomes closer to the center line LN2, and decreases the risk potential p as an area becomes farther from the center line LN2. Since the center line LN2 allows a vehicle to overtake unlike the roadway outside lines LN1 and LN3, the risk area calculation unit 144 sets the risk potential p for the center line LN2 to be lower than the risk potential p for the roadway outside lines LN1 and LN3.

In the risk area RA, the risk area calculation unit 144 increases the risk potential p as an area becomes closer to the preceding vehicle m1 which is a type of object, and decreases the risk potential p as an area becomes farther from the preceding vehicle m1. That is, in the risk area RA, the risk area calculation unit 144 may increase the risk potential p as the relative distance between the host vehicle M and the preceding vehicle m1 becomes shorter, and may decrease the risk potential p as the relative distance between the host vehicle M and the preceding vehicle m1 becomes longer. In this case, the risk area calculation unit 144 may increase the risk potential p as the absolute speed or absolute acceleration of the preceding vehicle m1 becomes higher. The risk potential p may be appropriately decided in accordance with the relative speed or relative acceleration between the host vehicle M and the preceding vehicle m1, a time to collision (TTC), or the like instead of or in addition to the absolute speed or absolute acceleration of the preceding vehicle m1.

Figure 4:
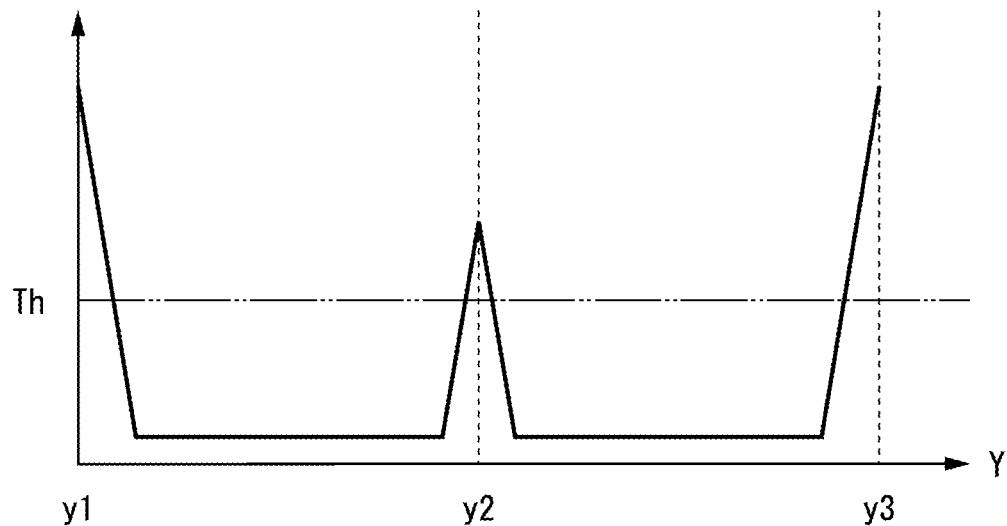
FIG. 4 is a diagram illustrating a change in a risk potential in a Y direction at a certain coordinate x1.

FIG. 4 is a diagram illustrating a change in the risk potential p in a Y direction at a certain coordinate x1. In the drawing, y1 represents the position (coordinate) of the roadway outside line LN1 in the Y direction, y2 represents the position (coordinate) of the center line LN2 in the Y direction, and y3 represents the position (coordinate) of the roadway outside line LN3 in the Y direction.

As shown in the drawing, the risk potential p is highest near the coordinates (x1, y1) at which there is the roadway outside line LN1 and near the coordinates (x1, y3) at which there is the roadway outside line LN3, and the risk potential p is the second highest after the coordinates (x1, y1) and (x1, y3) near the coordinates (x1, y2) at which there is the center line LN2. As will be described later, in an area where the risk potential p is equal to or higher than a threshold Th determined in advance, a target trajectory TR is not generated in order to prevent a vehicle from entering the area.

Figure 5:
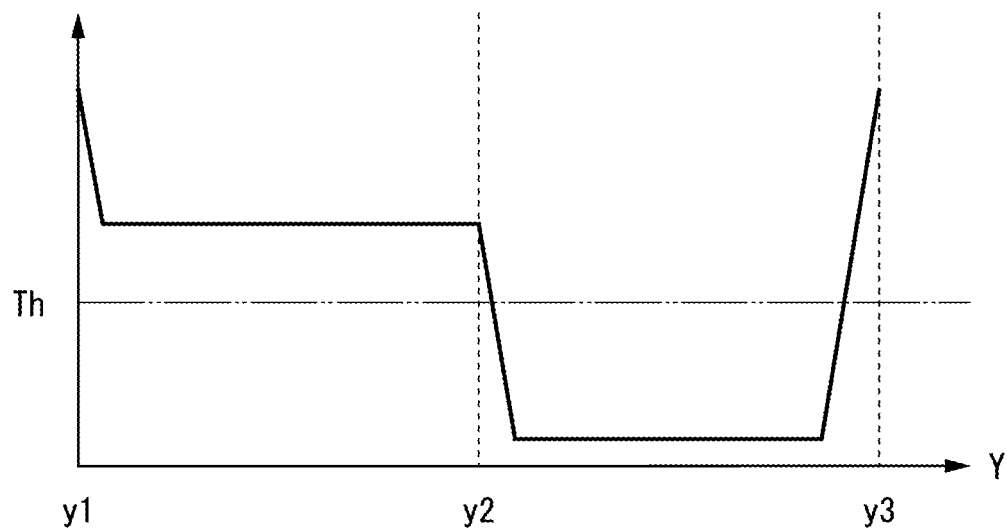
FIG. 5 is a diagram illustrating a change in a risk potential in the Y direction at a certain coordinate x2.

FIG. 5 is a diagram illustrating a change in the risk potential p in the Y direction at a certain coordinate x2. The coordinate x2 is closer to the preceding vehicle m1 than the coordinate x1. Therefore, although the preceding vehicle m1 is not in an area between the coordinates (x2, y1) at which there is the roadway outside line LN1 and the coordinates (x2, y2) at which there is the center line LN2, a risk such as sudden deceleration of the preceding vehicle m1 is considered. As a result, the risk potential p of the area between (x2, y1) and (x2, y2) has a tendency to be higher than the risk potential p of the area between (x1, y1) and (x1, y2), and is set to be equal to or higher than, for example, the threshold Th.

Figure 6:
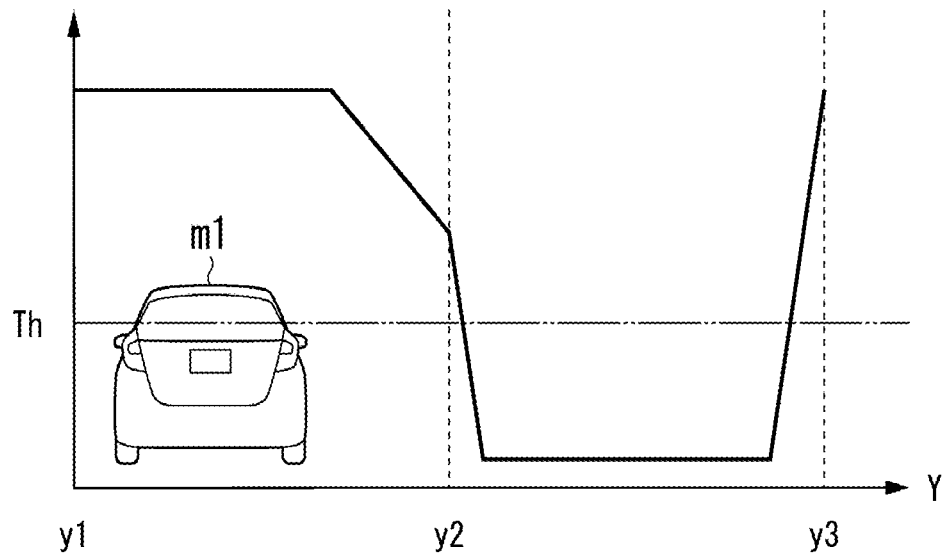
FIG. 6 is a diagram illustrating a change in a risk potential in the Y direction at a certain coordinate x3.

FIG. 6 is a diagram illustrating a change in the risk potential p in the Y direction at a certain coordinate x3. The preceding vehicle m1 is located at the coordinate x3. Therefore, the risk potential p of an area between the coordinates (x3, y1) at which there is the roadway outside line LN1 and the coordinates (x3, y2) at which there is the center line LN2 is higher than the risk potential p of the area between (x2, y1) and (x2, y2), and is set to be equal to or higher than, for example, the threshold Th.

Figure 7:
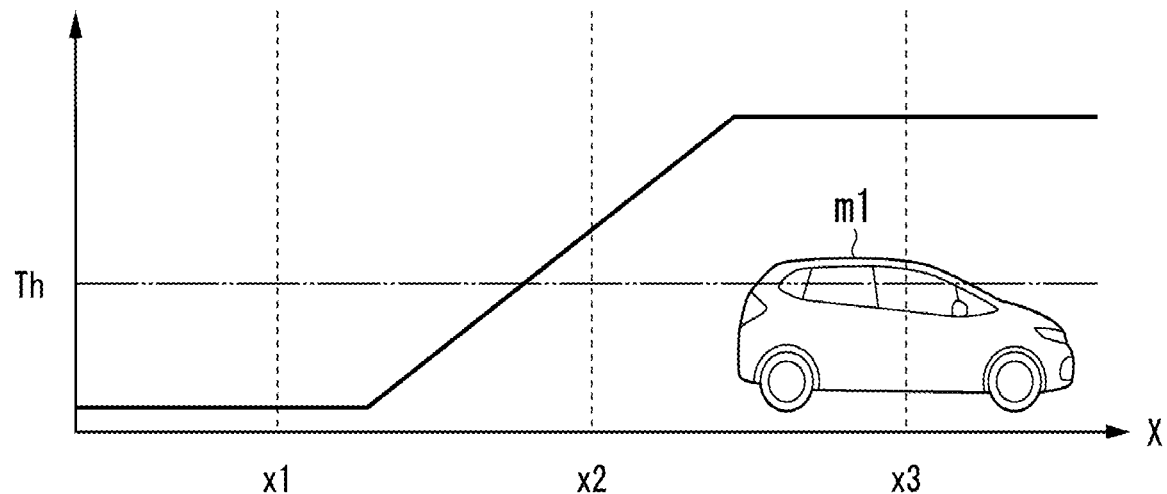
FIG. 7 is a diagram illustrating a change in a risk potential in an X direction at a certain coordinate y4.

FIG. 7 is a diagram illustrating a change in the risk potential p in an X direction at a certain coordinate y4. The coordinate y4 is an intermediate coordinate between y1 and y2, and the preceding vehicle m1 is located at the coordinate y4. Therefore, the risk potential p at the coordinates (x3, y4) is highest, the risk potential p at the coordinates (x2, y4) farther from the preceding vehicle m1 than the coordinates (x3, y4) is lower than the risk potential p at the coordinates (x3, y4), and the risk potential p at the coordinates (x1, y4) farther from the preceding vehicle m1 than the coordinates (x2, y4) is lower than the risk potential p at the coordinates (x2, y4).

Figure 8:
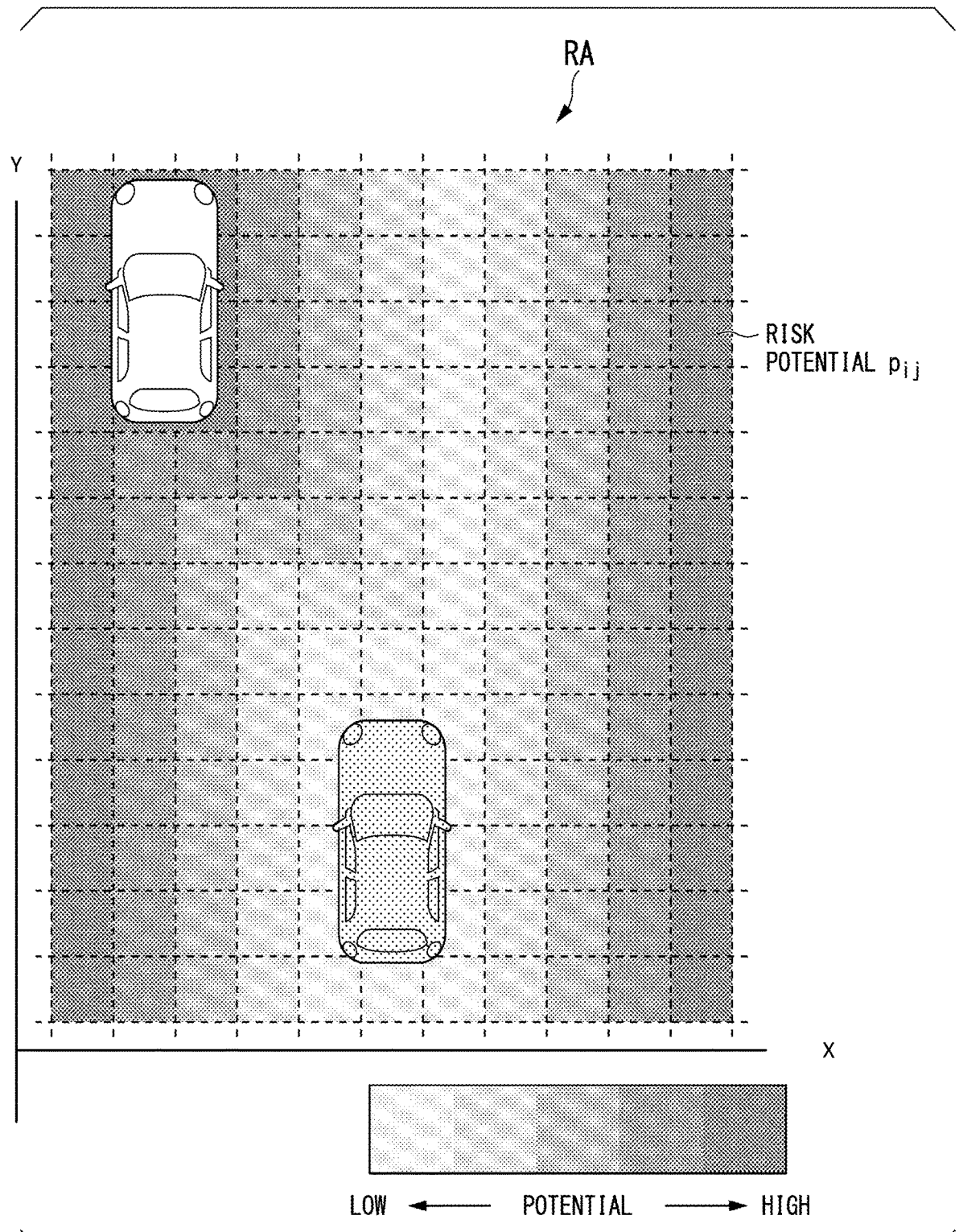
FIG. 8 is a diagram illustrating a risk area in which a risk potential is decided.

FIG. 8 is a diagram illustrating the risk area RA in which the risk potential p is decided. As shown in the drawing, the risk area calculation unit 144 partitions the risk area RA into a plurality of meshes (also referred to as grids), and associates the risk potential p with each of the plurality of meshes. For example, a risk potential $p_{ij}$ is associated with a mesh $(x_i, y_j)$. That is, the risk area RA is represented by a data structure such as a vector or a tensor.

In a case where the risk potential p is associated with the plurality of meshes, the risk area calculation unit 144 normalizes the risk potential p of each mesh.

For example, the risk area calculation unit 144 may normalize the risk potential p so that the maximum value of the risk potential p is set to 1 and the minimum value thereof is set to 0. Specifically, the risk area calculation unit 144 selects a risk potential $p_{max}$ having a maximum value and a risk potential $p_{min}$ having a minimum value from the risk potentials p of all the meshes included in the risk area RA. The risk area calculation unit 144 selects one mesh $(x_i, y_j)$ of interest from all the meshes included in the risk area RA, subtracts the minimum risk potential $p_{min}$ from a risk potential $p_{ij}$ associated with the mesh $(x_i, y_j)$, subtracts the minimum risk potential $p_{min}$ from the maximum risk potential $p_{max}$, and divides $(p_{ij}-p_{min})$ by $(p_{max}-p_{min})$. The risk area calculation unit 144 repeats the above processing while changing a mesh of interest. Thereby, the risk area RA is normalized so that the maximum value of the risk potential p is set to 1 and the minimum value thereof is set to 0.

The risk area calculation unit 144 may calculate an average value u and a standard deviation σ of the risk potentials p of all the meshes included in the risk area RA, subtract the average value u from the risk potential $p_{ij}$ associated with the mesh $(x_i, y_j)$, and divide $(p_{ij}-\mu)$ by the standard deviation σ. Thereby, the risk area RA is normalized so that the maximum value of the risk potential p is set to 1 and the minimum value thereof is set to 0.

The risk area calculation unit 144 may normalize the risk potential p so that the maximum value of the risk potential p is set to an arbitrary M and the minimum value thereof is set to an arbitrary m. Specifically, in a case where $(p_{ij}-p_{min})/(p_{max}-p_{min})$ is defined as A, the risk area calculation unit 144 multiplies A by (M−m), and adds m to A(M−m). Thereby, the risk area RA is normalized so that the maximum value of the risk potential p is set to M and the minimum value thereof is set to m.

FIG. 2 will be described again. The target trajectory generation unit 146 generates a future target trajectory TR along which the host vehicle M is caused to travel automatically (irrespective of a driver's operation) in a traveling mode specified by an event so that the host vehicle M travels in a recommended lane decided by the recommended lane decision unit 61 in principle and copes with its peripheral situation when the host vehicle M travels in the recommended lane. The target trajectory TR includes, for example, a position element for determining a future position of the host vehicle M and a speed element for determining a future speed or the like of the host vehicle M.

For example, the target trajectory generation unit 146 decides a plurality of points (trajectory points) at which the host vehicle M will arrive in order as position elements of the target trajectory TR. The trajectory points are points at which the host vehicle M will arrive after predetermined traveling distances (for example, approximately every several [m]). The predetermined traveling distances may be calculated by, for example, a distance along a road when advancing along a route.

The target trajectory generation unit 146 decides a target speed v and a target acceleration a for each predetermined sampling time (for example, several tenths of a [sec]) as speed elements of the target trajectory TR. The trajectory points may be positions at which the host vehicle M will arrive at sampling times for respective predetermined sampling times. In this case, the target speed v or the target acceleration a is decided by intervals between sampling times and trajectory points.

For example, the target trajectory generation unit 146 reads out the rule-based model data 182, the DNN model data 184 from the storage unit 180, or the like, and generates the target trajectory TR using a model defined by the read-out data.

The rule-based model data 182 is information (a program or a data structure) in which one or a plurality of rule-based models MDL1 are defined. The rule-based model MDL1 is a model for deriving the target trajectory TR from the risk area RA on the basis of a rule group determined in advance by an expert or the like. Such a rule-based model MDL1 is also referred to as an expert system because an expert or the like determines a rule group. The rule-based model MDL1 is an example of a "first model."

For example, in the rule group, there may be a rule in which a target trajectory TRx is uniquely associated with a certain condition X. The condition X is, for example, that the risk area RA which is input to the rule-based model MDL1 is the same as a risk area $RA_X$ capable of being generated when the host vehicle M is traveling on a one-lane road and there is a preceding vehicle at a speed of XX [km/h] within a predetermined distance in front of the host vehicle M. The target trajectory TRx is, for example, a target trajectory TR in which the target speed is $v_X$, the target acceleration is $\alpha_X$, the amount of displacement of steering is $u_X$, and the curvature of the trajectory is $\kappa_X$. In the case of following such a rule, the rule-based model MDL1 outputs the target trajectory TRx when a risk area RA satisfying the condition X is input.

Although an expert or the like determines the rule group, it is rare that all kinds of rules are comprehensively determined. Therefore, a situation in which the host vehicle M is not in the rule group (a situation which is not assumed by an expert) is also assumed, and a risk area RA that does not correspond to the rule group may be input to the rule-based model MDL1. In this case, the rule-based model MDL1 does not output the target trajectory TR. Instead, in a case where the risk area RA that does not correspond to the rule group is input, the rule-based model MDL1 may output a target trajectory TR determined in advance which is not dependent on the current risk area RA such as traveling in the current lane at a speed determined in advance. That is, the rule group may include a general rule for coping with an irregular situation of outputting a target trajectory TR determined in advance which is not dependent on the current risk area RA in a case where a risk area RA which is not assumed beforehand is input.

The DNN model data 184 is information (a program or a data structure) in which one or a plurality of DNN models MDL2 are defined. The DNN model MDL2 is a deep learning model learned so as to output the target trajectory TR when the risk area RA is input. Specifically, the DNN model MDL2 may be a convolutional neural network (CNN), a reccurent neural network (RNN), or a combination thereof. The DNN model data 184 includes, for example, various types of information such as coupling information on how units included in each of a plurality of layers constituting a neural network are coupled to each other or coupling coefficients given to data which is input and output between the coupled units. The DNN model MDL2 is an example of a "second model."

The coupling information includes information such as, for example, the number of units included in each layer, information for designating the type of unit to which each unit is coupled, an activation function of each unit, or a gate provided between units of a hidden layer. The activation function may be, for example, a normalized linear function (a ReLU function), or may be a sigmoid function, a step function, other functions, or the like. The gate allows selective passage of or weights, for example, data transmitted between the units in accordance with a value (for example, 1 or 0) returned by the activation function. The coupling coefficient includes, for example, a weight coefficient given to output data when data is output from a unit of a certain layer to a unit of a deeper layer in a hidden layer of a neural network. The coupling coefficient may include a specific bias component of each layer, or the like.

The DNN model MDL2 is sufficiently learned, for example, on the basis of teaching data. The teaching data is, for example, a data set in which the target trajectory TR of a correct answer to be output by the DNN model MDL2 is associated with the risk area RA as a teaching label (also referred to as a target). That is, the teaching data is a data set in which the risk area RA which is input data and the target trajectory TR which is output data are combined. The target trajectory TR of a correct answer may be, for example, a target trajectory that passes through a mesh in which the risk potential p is lower than the threshold Th and the risk potential p is lowest in a plurality of meshes included in the risk area RA. The target trajectory TR of a correct answer may be, for example, a trajectory of a vehicle actually driven by a driver under a certain risk area RA.

The target trajectory generation unit 146 selects any one model MDL from a model set including one or a plurality of rule-based models MDL1 and one or a plurality of DNN models MDL2 in accordance with the type of road on which the host vehicle M travels or the type of driving mode (automation level) of the host vehicle M. The target trajectory generation unit 146 inputs the risk area RA calculated by the risk area calculation unit 144 to the selected model MDL, and generates the target trajectory TR on the basis of the output result of a model MDL to which the risk area RA is input.

Figure 9:
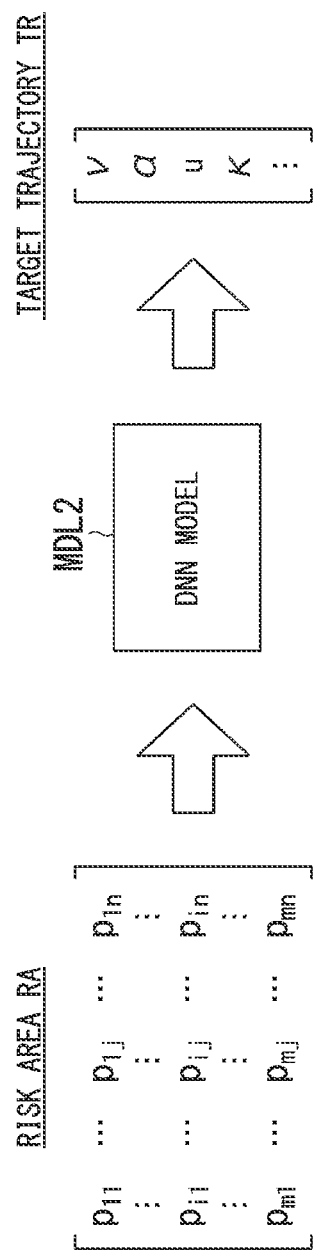
FIG. 9 is a diagram schematically illustrating a method of generating a target trajectory.

FIG. 9 is a diagram schematically illustrating a method of generating the target trajectory TR. For example, in a case where a certain DNN model MDL2 is selected, the target trajectory generation unit 146 inputs a vector or a tensor indicating the risk area RA to the DNN model MDL2. The number of elements (the number of dimensions) of a vector or a tensor indicating the risk area RA fluctuates depending on the type of selected model MDL. In the shown example, the risk area RA is represented as a second-order tensor of m rows and n columns, and in this case, the number of rows m and the number of columns n fluctuate depending on the type of selected model MDL. The model MDL to which a vector or a tensor indicating the risk area RA is input outputs the target trajectory TR. This target trajectory TR is represented by a vector or a tensor including a plurality of elements such as, for example, the target speed v, the target acceleration a, the amount of displacement u of steering, and the curvature k of a trajectory.

Figure 10:
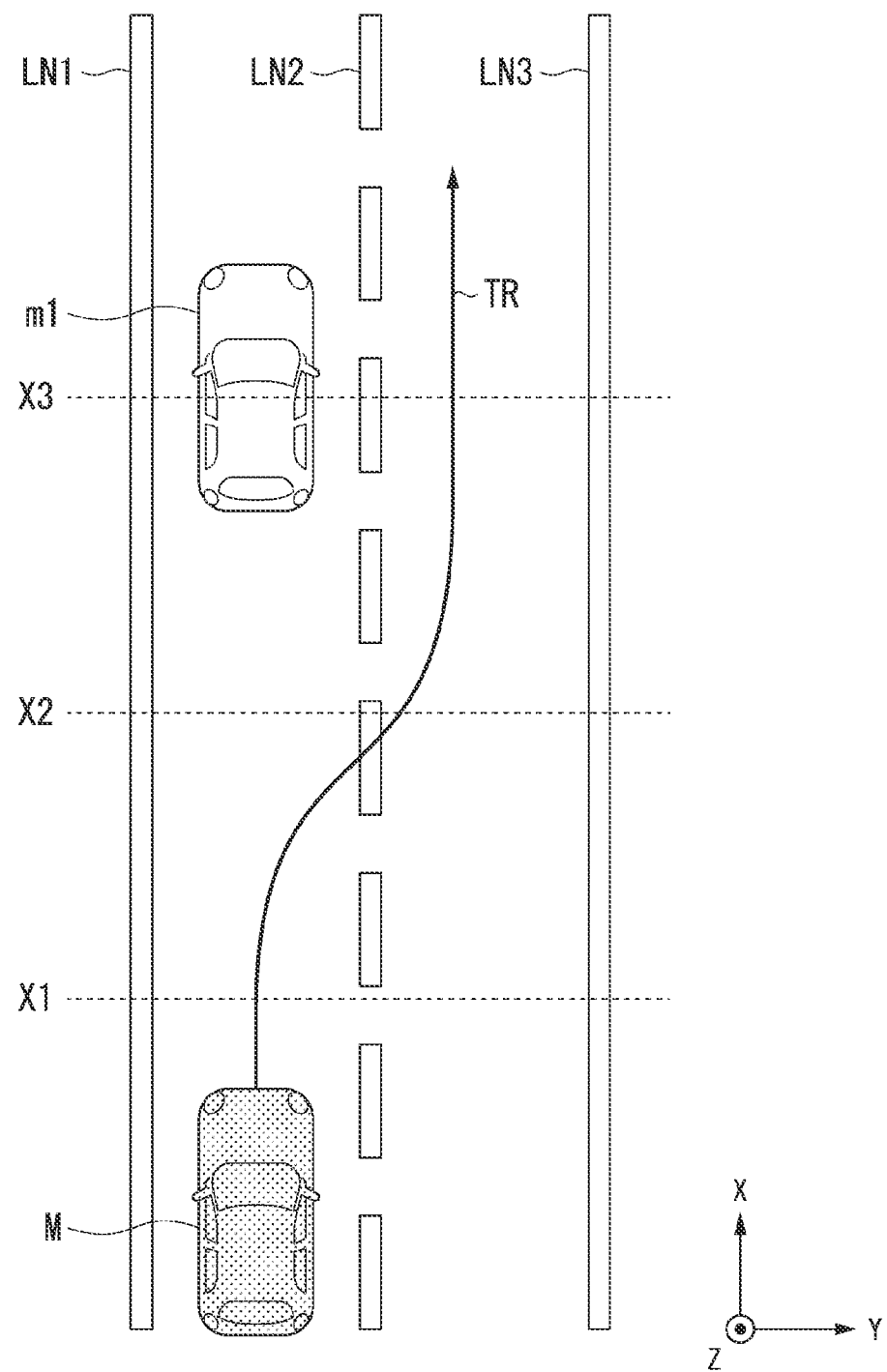
FIG. 10 is a diagram illustrating an example of a target trajectory which is output by a model.

FIG. 10 is a diagram illustrating an example of the target trajectory TR which is output by the model MDL. As in the shown example, since the risk potential p around the preceding vehicle m1 becomes high, the target trajectory TR is generated so as to avoid this. As a result, the host vehicle M changes its lane to the adjacent lane partitioned by the partition lines LN2 and LN3 and passes the preceding vehicle m1.

FIG. 2 will be described again. The second control unit 160 controls the traveling driving force output device 200, the brake device 210, and the steering device 220 so that the host vehicle M passes along the target trajectory TR generated by the target trajectory generation unit 146 according to scheduled times. The second control unit 160 includes, for example, a first acquisition unit 162, a speed control unit 164, and a steering control unit 166. The second control unit 160 is an example of a "driving control unit."

The first acquisition unit 162 acquires the target trajectory TR from the target trajectory generation unit 146, and stores the target trajectory in the memory of the storage unit 180.

The speed control unit 164 controls one or both of the traveling driving force output device 200 and the brake device 210 on the basis of the speed element (such as, for example, the target speed v or the target acceleration a) included in the target trajectory TR stored in the memory.

The steering control unit 166 controls the steering device 220 in accordance with the position element (such as, for example, the curvature k of the target trajectory or the amount of displacement u of steering according to the position of a trajectory point) included in the target trajectory stored in the memory.

The processes of the speed control unit 164 and the steering control unit 166 are realized by, for example, a combination of feedforward control and feedback control. As an example, the steering control unit 166 executes a combination of feedforward control according to the curvature of a road in front of the host vehicle M and feedback control based on deviation from the target trajectory TR.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and a power electronic control unit (ECU) that controls these components. The power ECU controls the above components in accordance with information which is input from the second control unit 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second control unit 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second control unit 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second control unit 160 or the information which is input from the driving operator 80, and changes the direction of the turning wheel.

The third control unit 170 includes a second acquisition unit 172, a mode control unit 174, a first determination unit 176, and a second determination unit 178. The second acquisition unit 172 acquires, for example, the recognition result of the recognition unit 130, or acquires information which is input by an occupant to the HMI 30. The second acquisition unit 172 provides various types of acquired information to the mode control unit 174, the first determination unit 176, and the second determination unit 178.

The mode control unit 174 controls the driving mode of the host vehicle M. Examples of the driving mode of the host vehicle M include a manual driving mode and an automated driving mode. The manual driving mode is a mode in which the speed and steering of the host vehicle M is controlled in accordance with the occupant's driving operation.

The automated driving mode is a mode in which any one of the speed or steering of the host vehicle M or both the speed and steering of the host vehicle M are automatically controlled irrespective of the occupant's driving operation. The automated driving mode includes a plurality of automated driving modes such as a first automated driving mode, a second automated driving mode, a third automated driving mode, a fourth automated driving mode, and a fifth automated driving mode. These automated driving modes differ in the level of automation of control. Further, in some automated driving modes out of the plurality of automated driving modes, a duty (also referred to as a task) according to the level of automation of control is imposed on the occupant of the host vehicle M.

The first automated driving mode is an automated driving mode in which the level of automation is lowest. In the first automated driving mode, driving assistance control such as, for example, ACC or LKAS is performed. In the first automated driving mode, the LKAS is restricted while the ACC is performed, and the ACC is restricted while the LKAS is performed. That is, in the first automated driving mode, steering control and speed control are sequentially processed. In the first automated driving mode, a first duty and a second duty are imposed on the occupant of the host vehicle M. The first duty is a duty of monitoring the vicinity (particularly the front) of the host vehicle M, and the second duty is a duty of operating a steering wheel. The term "operating" may mean grasping with a hand or touching with a hand.

The second automated driving mode is an automated driving mode in which the level of automation is higher than that in the first automated driving mode. In the second automated driving mode, a plurality of types of driving assistance control such as, for example, ACC, LKAS, and ALC are performed in conjunction with each other. In the second automated driving mode, the degree of duty which is required of the occupant is equal to or lower than that in the first automated driving mode. For example, in the second automated driving mode, the first duty is imposed on the occupant, and in principle, the second duty is not imposed. In the second automated driving mode, the second duty may be further imposed on the occupant at a timing such as immediately before some driving assistance control such as the ALC is performed.

The third automated driving mode is an automated driving mode in which the level of automation is higher than that in the second automated driving mode. In the third automated driving mode, in a case where a specified condition is satisfied, both the speed and steering of the host vehicle M are automatically controlled. The specified condition is, for example, traveling on a road where there are few obstacles and the host vehicle M can recognize the host lane or recognize the relative position of the host vehicle M with respect to the host lane. Such a road is, for example, an expressway. In the third automated driving mode, the degree of duty which is required of the occupant is lower than that in the second automated driving mode. For example, in the third automated driving mode, neither the first duty nor the second duty is imposed on the occupant. In the third automated driving mode, the occupant's driving operation may be required in an emergency or the like.

The fourth automated driving mode is an automated driving mode in which the level of automation is equal to or higher than that in the third automated driving mode. In the fourth automated driving mode, in a case where a specified condition is satisfied, both the speed and steering of the host vehicle M are automatically controlled. In the fourth automated driving mode, similarly to the third automated driving mode, the degree of duty which is required of the occupant is lower than that in the second automated driving mode. For example, in the fourth automated driving mode, neither the first duty nor the second duty is imposed on the occupant. In the fourth automated driving mode, both the speed and steering of the host vehicle M are automatically controlled irrespective of the occupant's driving operation even in an emergency or the like.

The fifth automated driving mode is an automated driving mode in which the level of automation is equal to or higher than that in the fourth automated driving mode. In the fifth automated driving mode, both the speed and steering of the host vehicle M are automatically controlled regardless of a specified condition. In the fifth automated driving mode, similarly to the third automated driving mode or the fourth automated driving mode, the degree of duty which is required of the occupant is lower than that in the second automated driving mode. For example, in the fifth automated driving mode, neither the first duty nor the second duty is imposed on the occupant.

For example, in a case where the host vehicle M in the second automated driving mode satisfies a specified condition, the mode control unit 174 may switch the driving mode to an automated driving mode having a higher automation level than the second automated driving mode (for example, the third automated driving mode).

For example, in a case where the host vehicle M in the third automated driving mode or the fourth automated driving mode does not satisfy a specified condition, the mode control unit 174 may switch the driving mode to the second automated driving mode or the first automated driving mode. The wording "not satisfy a specified condition" means, for example, traveling on a road having more obstacles than an expressway and having a complicated surrounding situation or a road on which lanes or the like cannot be recognized. Such a road is, for example, a public highway.

The mode control unit 174 may control the driving mode of the host vehicle M on the basis of the determination results of the first determination unit 176 and the second determination unit 178 to be described later.

The mode control unit 174 may control the driving mode on the basis of a detection signal which is input from the driving operator 80. For example, in the automated driving mode, in a case where the occupant operates a steering wheel, an accelerator pedal, or a brake pedal with an amount of operation exceeding a threshold, the mode control unit 174 may switch the driving mode to the manual driving mode.

The mode control unit 174 may control the driving mode of the host vehicle M on the basis of an input operation with respect to the HMI 30.

The first determination unit 176 analyzes an image generated by the in-vehicle camera 90 in the automated driving mode in which the first duty is imposed, and detects the direction of the eyes or the direction of the face of the occupant in a driver's seat. The first determination unit 176 determines whether the occupant in the driver's seat is monitoring the vicinity of the host vehicle M on the basis of the detected direction of the eyes or the face. That is, the first determination unit 176 determines whether the occupant is fulfilling the first duty. For example, in a case where the occupant is looking out of the vehicle through the front windshield, the first determination unit 176 determines that the occupant is monitoring the vicinity of the host vehicle M. That is, the first determination unit 176 determines that the occupant is fulfilling the first duty.

The second determination unit 178 determines whether the occupant is grasping a steering wheel with his/her hand or is touching his/her hand to the steering wheel on the basis of the detection result of a steering senor in the automated driving mode in which the second duty is imposed. That is, the second determination unit 178 determines whether the occupant is fulfilling the second duty. For example, in a case where a current value or a steering torque detected by the steering senor is equal to or greater than a threshold, the second determination unit 178 determines that the occupant is grasping the steering wheel with his/her hand or is touching his/her hand to the steering wheel. That is, the second determination unit 178 determines that the occupant is fulfilling the second duty.

[Process Flow]

Figure 11:
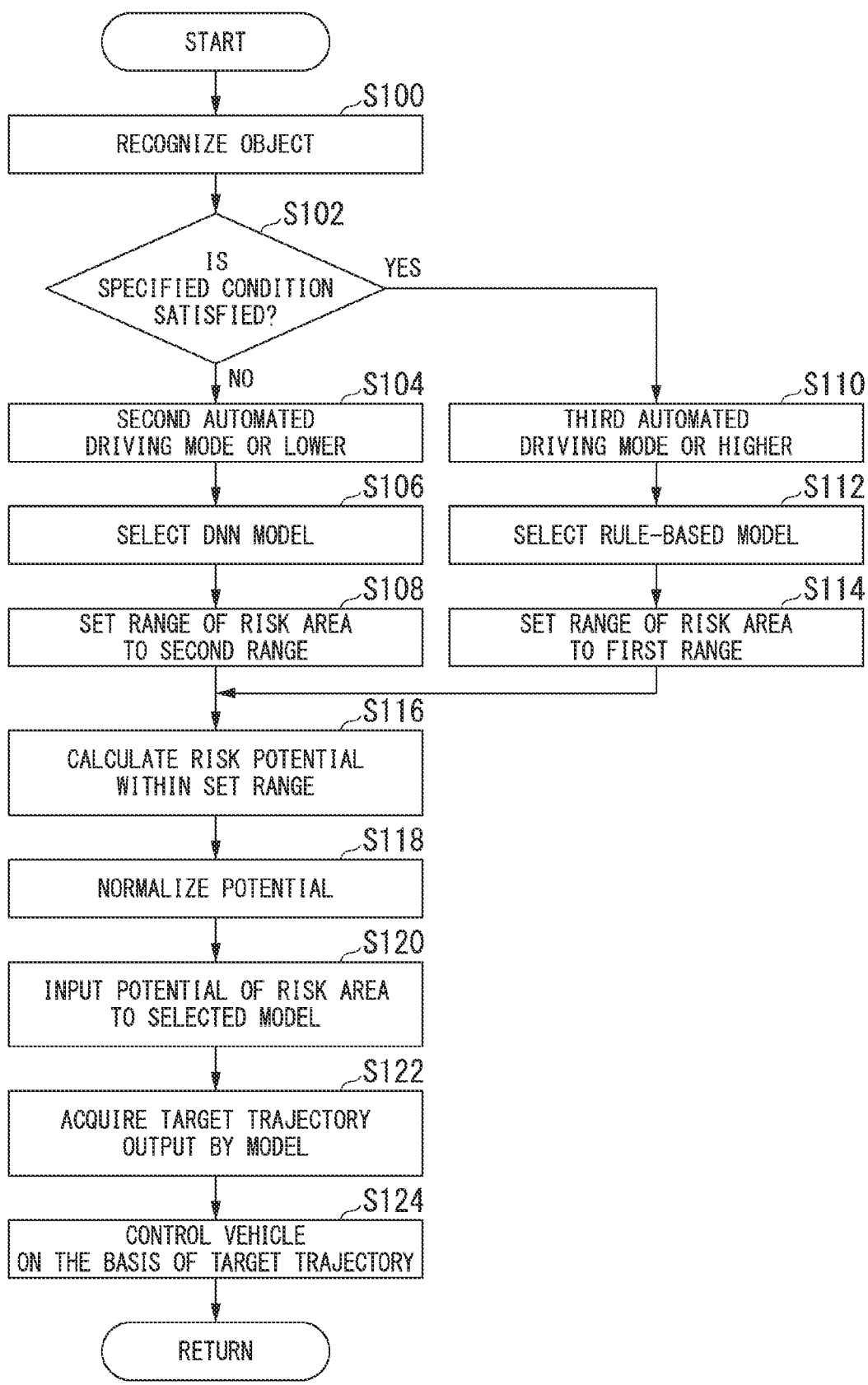
FIG. 11 is a flowchart illustrating an example of a flow of a series of processes performed by an automated driving control device according to the first embodiment.

Hereinafter, a flow of a series of processes performed by the automated driving control device 100 according to the first embodiment will be described with reference to a flowchart. FIG. 11 is a flowchart illustrating an example of a flow of a series of processes performed by the automated driving control device 100 according to the first embodiment. The processing of the present flowchart may be repeatedly executed with a predetermined period, for example, in a case where the driving mode is an "automated driving mode."

First, the recognition unit 130 recognizes an object on a road on which the host vehicle M is traveling (step S100).

Next, the mode control unit 174 determines whether a specified condition is satisfied (step S102). For example, in a case where the host vehicle M is traveling on a public highway, the mode control unit 174 determines that the specified condition is not satisfied, and switches the driving mode to the second automated driving mode or switches it to the first automated driving mode in which the level of automation is lower than that in the second automated driving mode (step S104).

In a case where the driving mode is the second automated driving mode or the first automated driving mode in which the level of automation is lower than that in the second automated driving mode, the target trajectory generation unit 146 selects any one DNN model MDL2 from a model set in which one or a plurality of rule-based models MDL1 and one or a plurality of DNN models MDL2 are included (step S106). In other words, in a case where the automation level of an automated driving mode is lower than the automation level of the third automated driving mode, the target trajectory generation unit 146 selects the DNN model MDL2. The automation level of the third automated driving mode is an example of a "reference value."

In a case where the DNN model MDL2 is selected by the target trajectory generation unit 146, the risk area calculation unit 144 sets the range of the risk area RA to a second range smaller than a first range to be described later (step S108). For example, in a case where a plurality of DNN models MDL2 are included in the model set, the risk area calculation unit 144 may set the second range of the same size even when any of the DNN models MDL2 is selected, or may set the second range of a different size under the restriction that it be smaller than at least the first range.

On the other hand, in a case where the host vehicle M is traveling on an expressway instead of a public highway, the mode control unit 174 determines that a specified condition is satisfied, and switches the driving mode to the third automated driving mode or switches it to the fourth automated driving mode or the fifth automated driving mode in which the level of automation is higher than that in the third automated driving mode (step S110).

In a case where the driving mode is the third automated driving mode or another automated driving mode in which the level of automation is higher than that in the third automated driving mode, the target trajectory generation unit 146 selects any one rule-based model MDL1 from the model set (step S112). In other words, in a case where the automation level of an automated driving mode is equal to or higher than the automation level of the third automated driving mode, the target trajectory generation unit 146 selects the rule-based model MDL1.

In a case where the rule-based model MDL1 is selected by the target trajectory generation unit 146, the risk area calculation unit 144 sets the range of the risk area RA to the first range greater than the second range described above (step S114). For example, in a case where a plurality of rule-based models MDL1 are included in the model set, the risk area calculation unit 144 may set the first range of the same size even when any of the rule-based models MDL1 is selected, or may set the first range of a different size under the restriction that it be greater than at least the second range.

Next, the risk area calculation unit 144 calculates the risk potential p within the set range of the risk area RA (step S116). For example, the risk area calculation unit 144 may divide the set range of the risk area RA into a plurality of meshes, and calculate data in which the risk potential p is associated with each of the plurality of meshes as a vector or a tensor.

Next, the risk area calculation unit 144 normalizes the calculated risk potential p (step S118).

Next, the target trajectory generation unit 146 inputs the risk area RA in which the risk potential p is normalized by the risk area calculation unit 144 to the selected model MDL (step S120). Specifically, the target trajectory generation unit 146 inputs a vector or a tensor indicating the risk area RA to the model MDL.

Next, the target trajectory generation unit 146 acquires the target trajectory TR from the model MDL to which the risk area RA is input (step S122), and outputs this target trajectory TR to the second control unit 160.

Next, the second control unit 160 controls at least one of the speed and steering of the host vehicle M on the basis of the target trajectory TR which is output by the target trajectory generation unit 146 (step S124). This concludes the processing of the present flowchart.

As described above, in a case where the rule-based model MDL1 that can generate the target trajectory TR with a high degree of accuracy insofar as matching the rule group determined in advance is selected, the range of the risk area RA which is input to the rule-based model MDL1 is set to the first range greater than the second range. This makes it possible to avoid a situation in which the risk potential p is set to be equal to or higher than the threshold Th over the entire risk area RA, the target trajectory TR is not generated, and the host vehicle M is stuck. There is a possibility of the accuracy of the target trajectory TR being lower than that of the rule-based model MDL1. However, in a case where a DNN model MDL2 that can be generally used in any situation is selected, the range of the risk area RA which is input to the DNN model MDL2 is set to the second range smaller than the first range. Thereby, it is possible to reduce the number of dimensions of a vector or a tensor which is input to the DNN model MDL2, and to improve the accuracy of the target trajectory TR.

Figure 12:
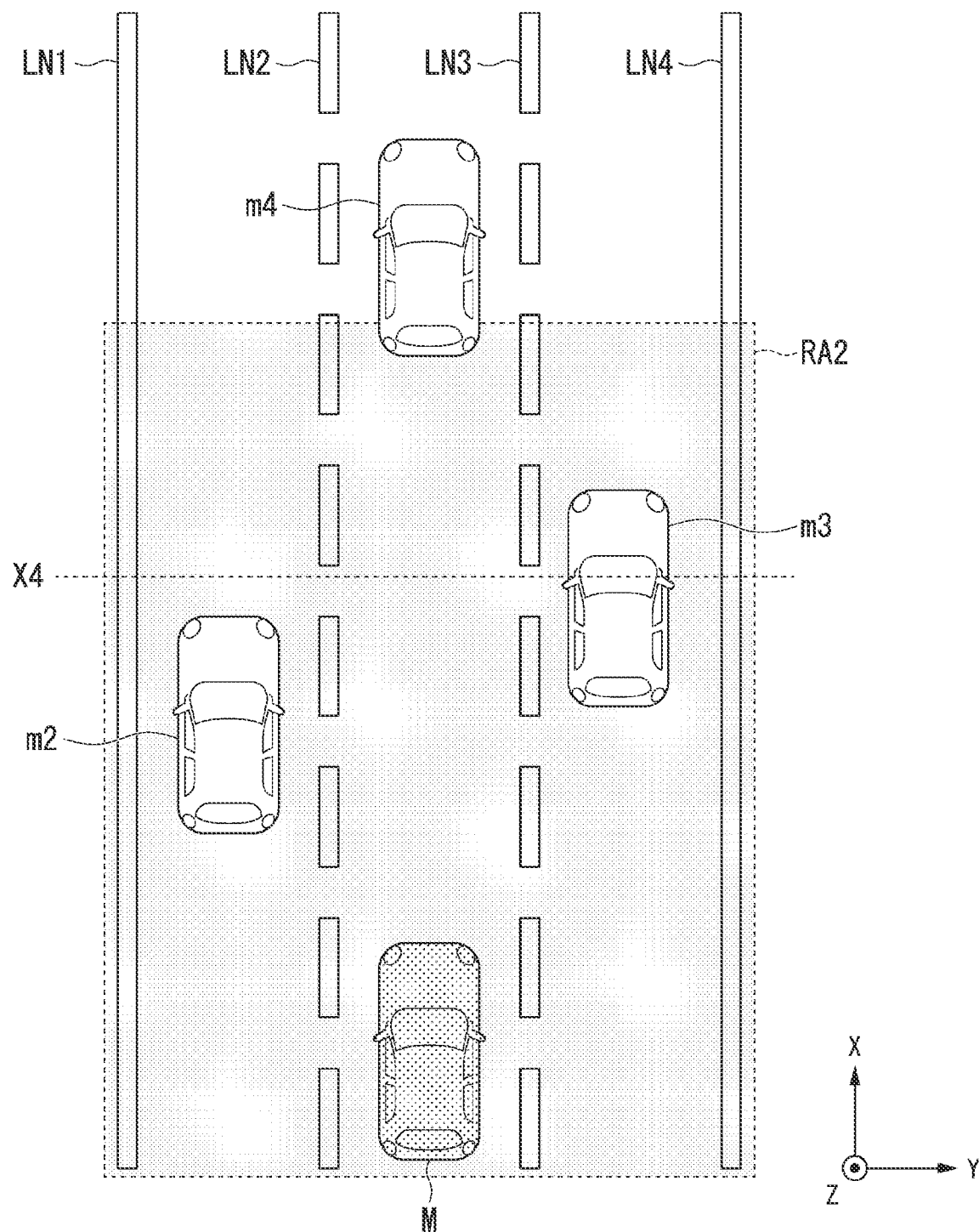
FIG. 12 is a diagram illustrating an example of a situation where traffic conditions are complicated.

FIG. 12 is a diagram illustrating an example of a situation where traffic conditions are complicated. In the shown example, the host vehicle M is traveling in a second lane (a lane partitioned by partition lines LN2 and LN3) in the middle of the three lanes. Another vehicle m2 is in a first lane (a lane partitioned by partition lines LN1 and LN2), and another vehicle m3 is in a third lane (a lane partitioned by partition lines LN3 and LN4). Further, in the second lane, another vehicle m4 is in front of the host vehicle M. These other vehicles m2, m3, and m4 are merely examples, and may be replaced with other objects such as fallen objects on a road, signboards for construction, or pedestrians.

In the situation illustrated in FIG. 12, the range of the risk area RA which is input to the rule-based model MDL1 is assumed to be set to the second range (the range of R2 in the drawing) instead of the first range. In this case, since the other vehicles m2, m3, and m4 are close to the host vehicle M, the risk potential p of an area where the host vehicle M travels can be set to be equal to or higher than the threshold Th.

Figure 13:
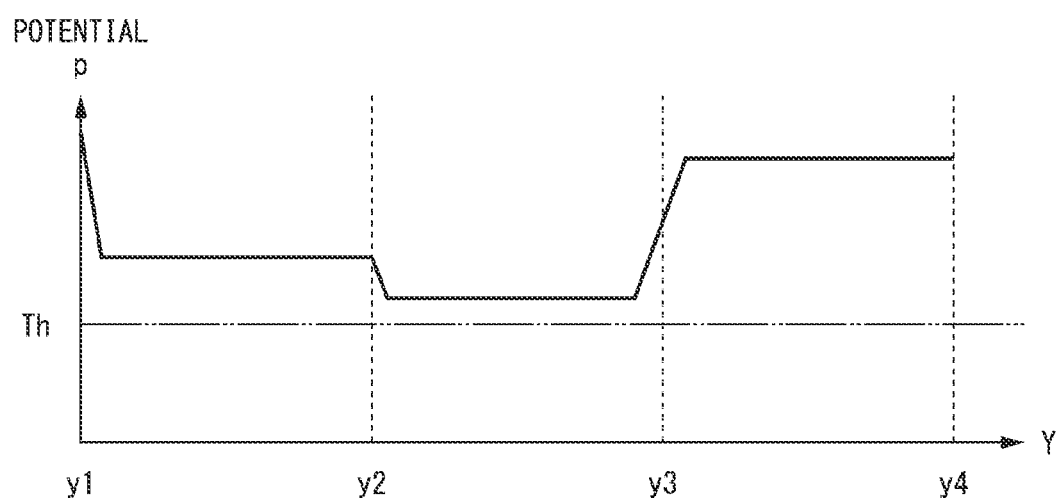
FIG. 13 is a diagram illustrating a change in a risk potential at a coordinate x4 in FIG. 12.

FIG. 13 is a diagram illustrating a change in the risk potential p at a coordinate x4 in FIG. 12. The risk potential p between the coordinates (x4, y1) at which there is a partition line LN1 and the coordinates (x4, y2) at which there is a partition line LN2 represents a risk potential p in a first lane. The risk potential p between the coordinates (x4, y2) at which there is the partition line LN2 and the coordinates (x4, y3) at which there is a partition line LN3 represents a risk potential p in a second lane. The risk potential p between the coordinates (x4, y3) at which there is the partition line LN3 and the coordinates (x4, y4) at which there is a partition line LN4 represents a risk potential p in a third lane.

Since the coordinate x4 is immediately before another vehicle m2 in a first traveling lane, the risk potential p at the coordinate x4 is set to be equal to or higher than the threshold Th in consideration of the acceleration and deceleration of another vehicle m2, or the like. Since the coordinate x4 is behind another vehicle m4 in a second traveling lane, the risk potential p at the coordinate x4 is lower than that in the first traveling lane but is set to be higher than the threshold Th. Since the coordinate x4 is a position at which there is another vehicle m3 in a third traveling lane, the risk potential p at the coordinate x4 is equal to or higher than the threshold Th and is set to be highest.

Figure 14:
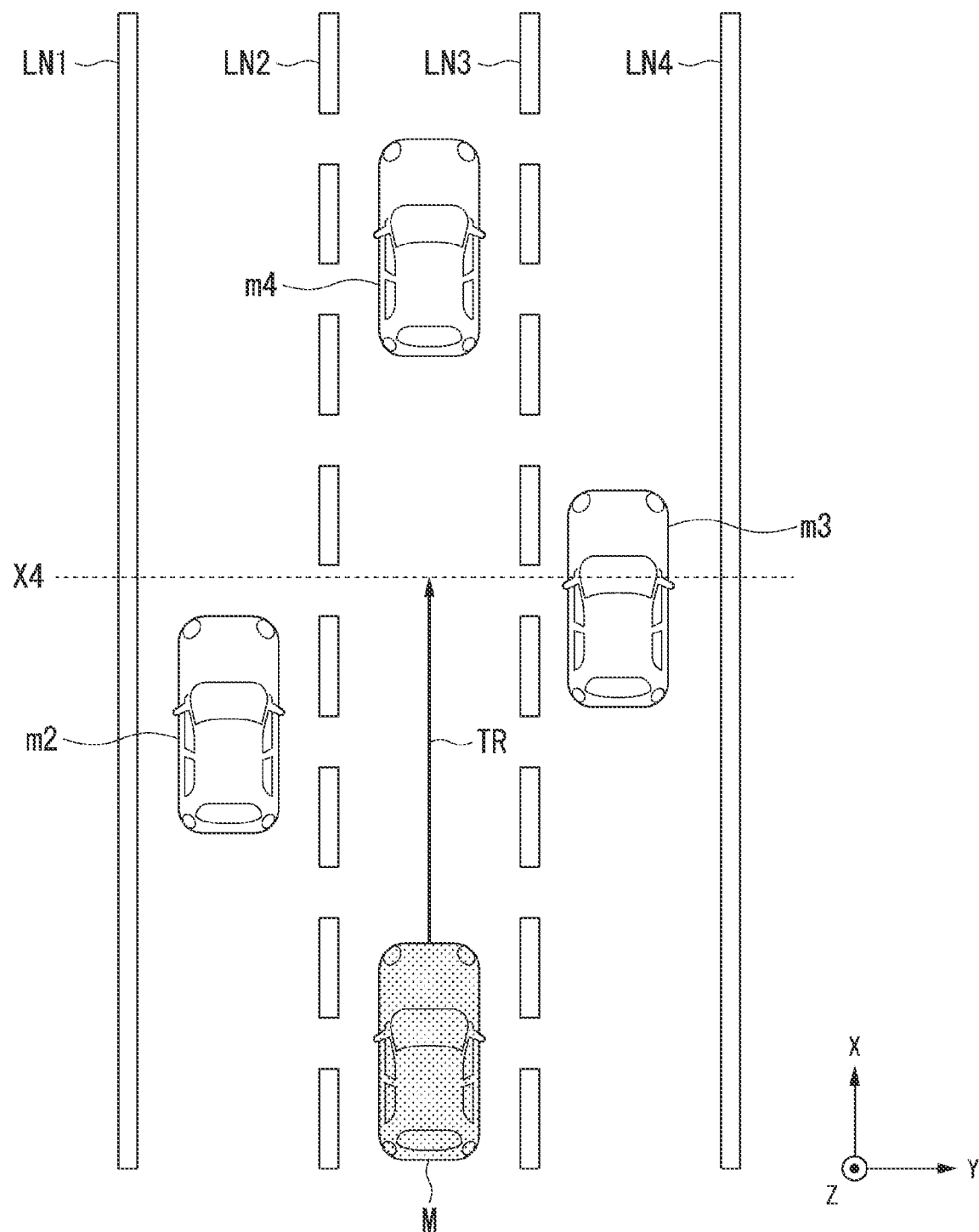
FIG. 14 is a diagram illustrating an example of a target trajectory which is output by the model in the situation illustrated in FIG. 12.

FIG. 14 is a diagram illustrating an example of the target trajectory TR which is output by the model MDL in the situation illustrated in FIG. 12. As described above, at the coordinate x4, since the risk potential p is set to be equal to or higher than the threshold Th with respect to all of the first traveling lane, the second traveling lane, and the third traveling lane, the target trajectory TR does not extend beyond at least the coordinate x4. In this case, the host vehicle M is surrounded by other vehicles m1, m2, and m3, and is stuck in a state of being unable to move from there.

Figure 15:
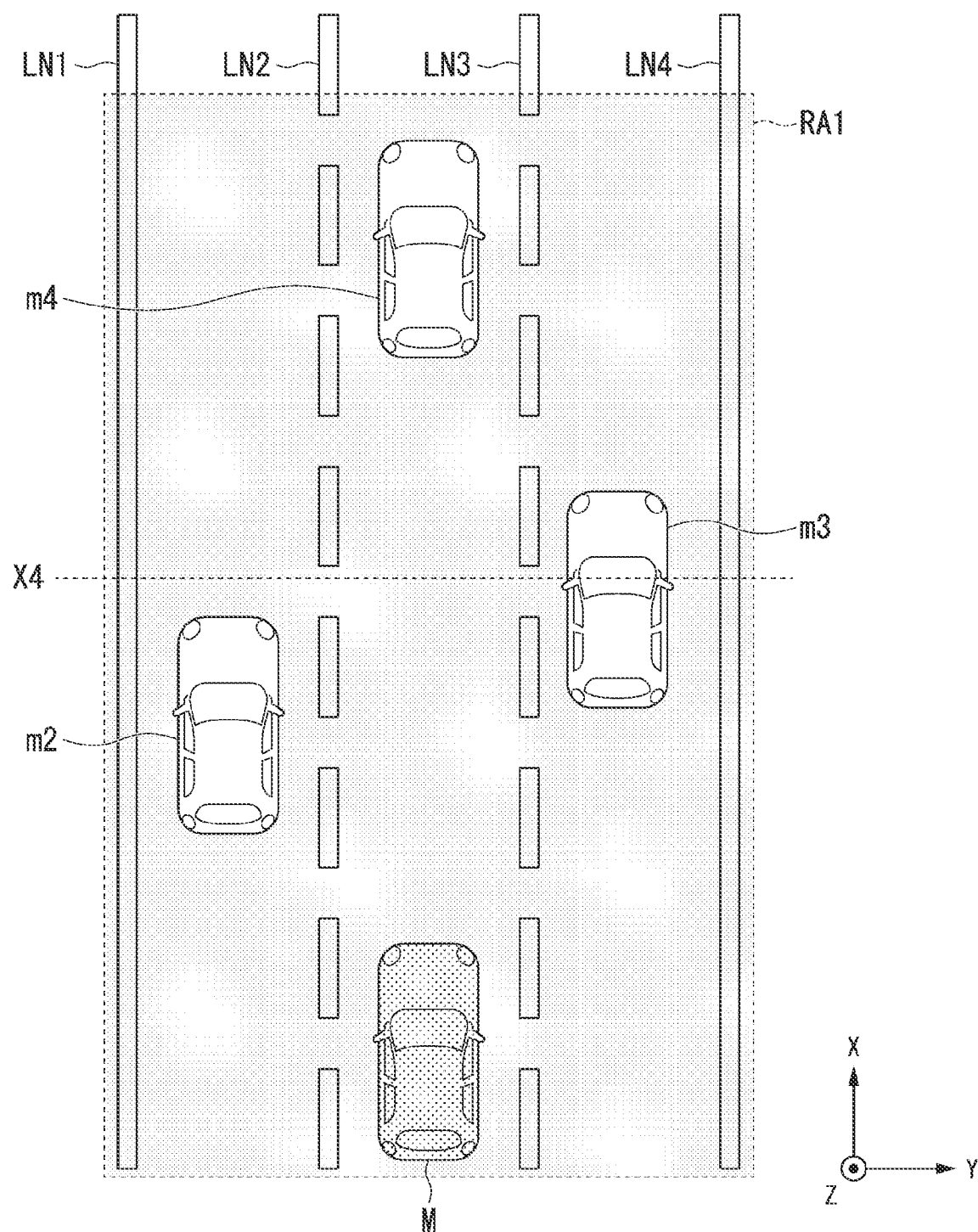
FIG. 15 is a diagram illustrating another example of the situation where traffic conditions are complicated.

FIG. 15 is a diagram illustrating another example of the situation where traffic conditions are complicated. In the situation illustrated in FIG. 15, the range of the risk area RA which is input to the rule-based model MDL1 is set to the first range (the range of R1 in the drawing) instead of the second range. In this case, the risk potential p is calculated in a wider range than in the situation of FIG. 12. Thereby, the risk potential p of the entire risk area RA2 is normalized, the risk potential p can be expected to be lower than in the situation of FIG. 12.

Figure 16:
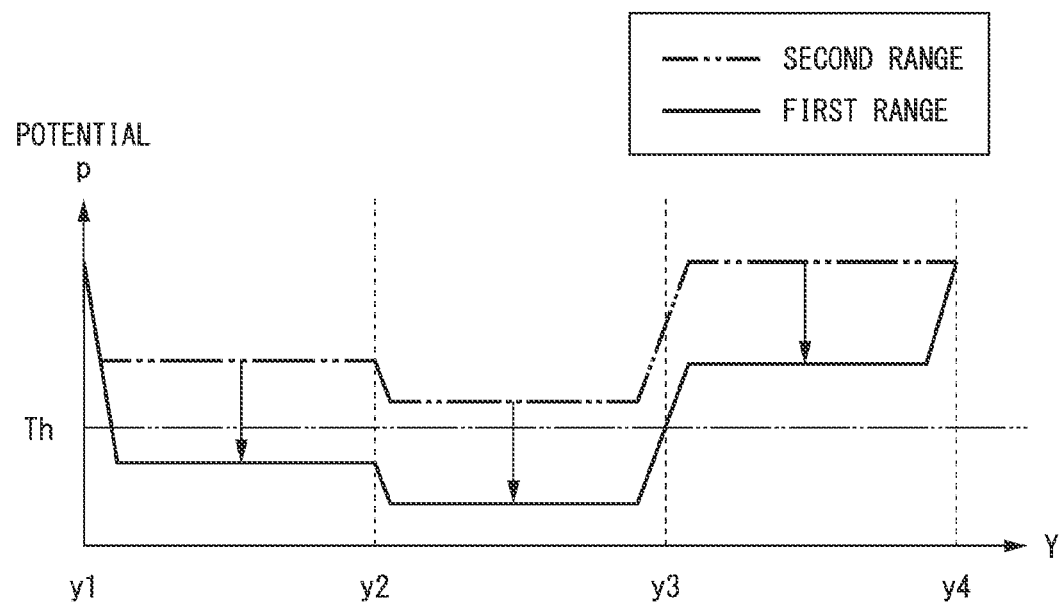
FIG. 16 is a diagram illustrating a change in a risk potential at the coordinate x4 in FIG. 15.

FIG. 16 is a diagram illustrating a change in the risk potential p at the coordinate x4 in FIG. 15. Since the range of the risk area RA is set to the first range greater than the second range, the risk potential p at the coordinate x4 is lower than in the second range as shown in the drawing. Particularly, in the first traveling lane and the second traveling lane, the risk potential p is set to be lower than the threshold Th.

Figure 17:
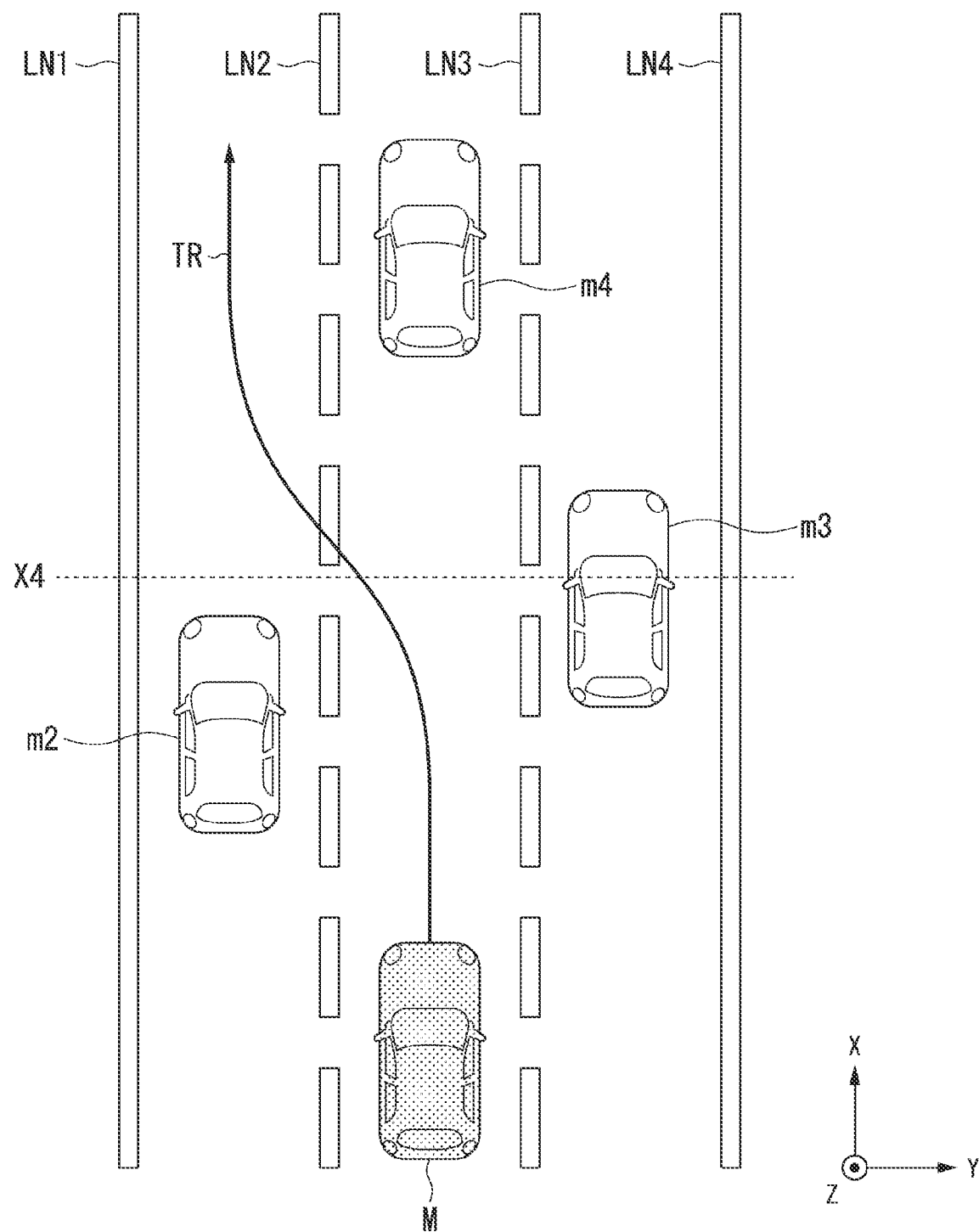
FIG. 17 is a diagram illustrating an example of a target trajectory which is output by the model in the situation illustrated in FIG. 15.

FIG. 17 is a diagram illustrating an example of the target trajectory TR which is output by the model MDL in the situation illustrated in FIG. 15. As described above, at the coordinate x4, the risk potential p is also set to be lower than the threshold Th with respect to the first traveling lane and the second traveling lane. Therefore, as shown in the drawing, a target trajectory TR in which the lane of the host vehicle M is changed from the second traveling lane to the first traveling lane, for example, in front of another vehicle m2 is generated. As a result, even in a situation in which the host vehicle M is surrounded by other vehicles m1, m2, and m3, the host vehicle M can be caused to travel smoothly without being stuck.

According to the first embodiment described above, the automated driving control device 100 selects any one model MDL from a plurality of models sets. In a case where the selected model MDL is the rule-based model MDL1, the automated driving control device 100 sets the range of the risk area RA to the first range. On the other hand, in a case where the selected model MDL is the DNN model MDL2, the automated driving control device 100 sets the range of the risk area RA to the second range. The automated driving control device 100 recognizes an object which is located near the host vehicle M, and calculates the risk area RA which is distributed around the object within the set range. The automated driving control device 100 inputs the calculated risk area RA to the selected model MDL, and generates the target trajectory TR on the basis of the output result of the model MDL to which the risk area RA is input. The automated driving control device 100 controls at least one of the speed and steering of the host vehicle M on the basis of the target trajectory TR. In this manner, since the range of the risk area RA is appropriately set in accordance with the type of the model MDL that generates the target trajectory TR, it is possible to generate the target trajectory TR which is suitable for the peripheral situation of the host vehicle M, and to smoothly control driving of the host vehicle M as a result.

Second Embodiment

Hereinafter, a second embodiment will be described. In the above-described first embodiment, a case where any one model MDL is selected from a plurality of models sets and then the risk area RA is input to the selected model MDL has been described. On the other hand, the second embodiment is different from the above-described first embodiment in that the risk area RA is input to all the models MDL instead of selecting any one model MDL from the plurality of models sets. Hereinafter, a description will be given with focus on differences from the first embodiment, and common points with respect to those in the first embodiment will not be described. In the description of the second embodiment, the same portions as those in the first embodiment are denoted by the same reference numerals and signs.

Figure 18:
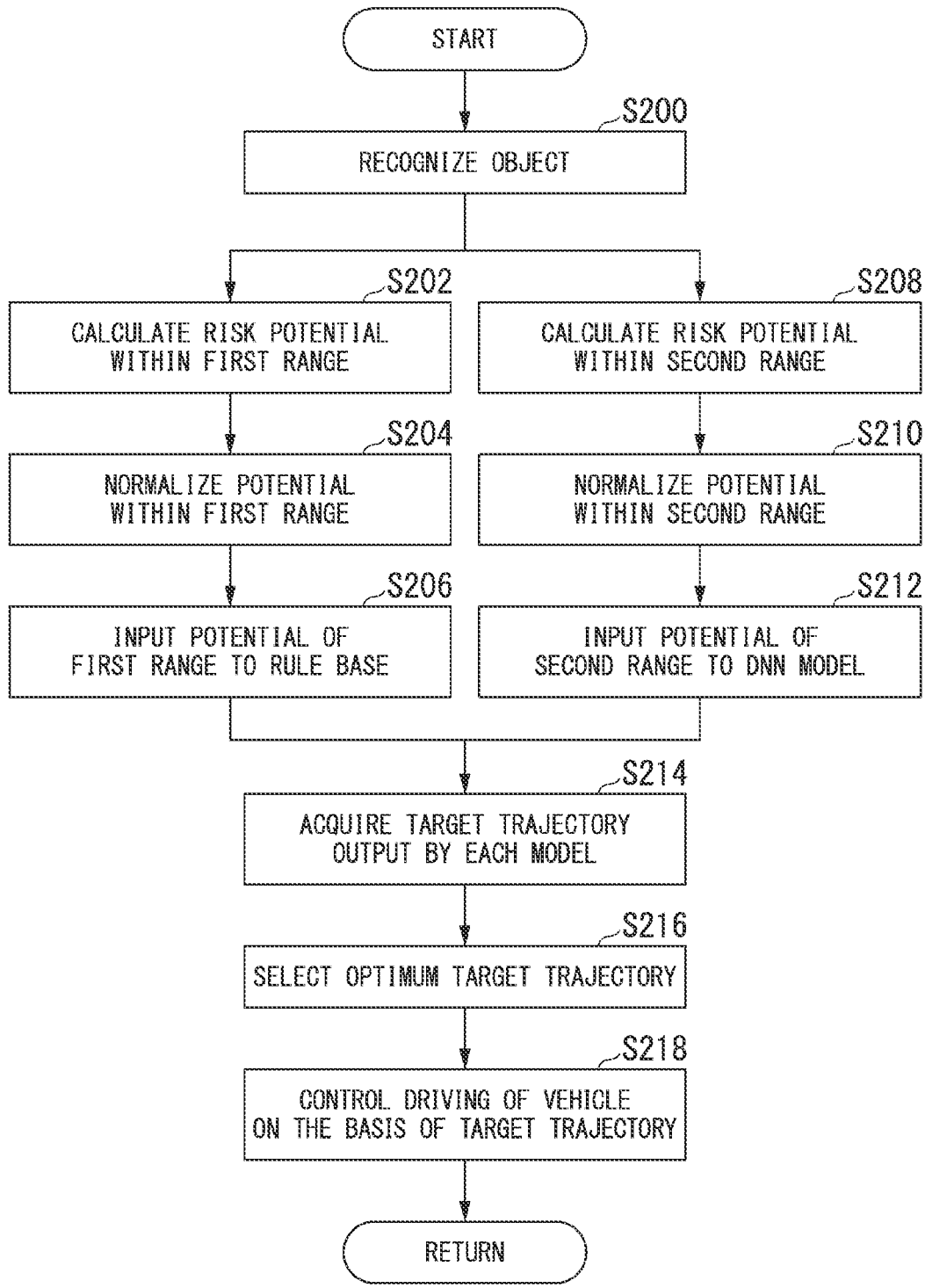
FIG. 18 is a flowchart illustrating an example of a flow of a series of processes performed by an automated driving control device according to a second embodiment.

FIG. 18 is a flowchart illustrating an example of a flow of a series of processes performed by the automated driving control device 100 according to the second embodiment. The processing of the present flowchart may be repeatedly executed with a predetermined period, for example, in a case where the driving mode is an "automated driving mode."

First, the recognition unit 130 recognizes an object on a road on which the host vehicle M is traveling (step S200).

Next, the risk area calculation unit 144 calculates the risk potential p within the first range (step S202).

Next, the risk area calculation unit 144 normalizes the risk potential p calculated within the first range (step S204).

Next, the target trajectory generation unit 146 inputs the risk area RA of the first range in which the risk potential p is normalized to the rule-based model MDL1 (step S206).

The risk area calculation unit 144 calculates the risk potential p within the second range (step S208).

Next, the risk area calculation unit 144 normalizes the risk potential p calculated within the second range (step S210).

Next, the target trajectory generation unit 146 inputs the risk area RA of the second range in which the risk potential p is normalized to the DNN model MDL2 (step S212).

Next, the target trajectory generation unit 146 acquires the target trajectory TR from both the rule-based model MDL1 and the DNN model MDL2 (step S214).

Next, the target trajectory generation unit 146 selects an optimum target trajectory TR from a plurality of target trajectories TR (step S216). For example, the target trajectory generation unit 146 selects a target trajectory closest to a human trajectory TRh as the optimum target trajectory TR. The term "human trajectory TRh" refers to, for example, a trajectory when a test driver or the like is caused to actually drive the host vehicle M or another vehicle. Therefore, the target trajectory generation unit 146 compares the speed element (such as the speed v or the acceleration a) and the position element (such as the amount of displacement u of steering or the curvature k of the trajectory) included in the target trajectory TR which is output by each of the plurality of models MDL with the speed element and the position element included in the human trajectory TRh, and selects the target trajectory TR closest to the position element and the position element of the human trajectory TRh among the plurality of target trajectories TR as the optimum target trajectory TR. The target trajectory generation unit 146 outputs the optimum target trajectory TR to the second control unit 160.

Next, the second control unit 160 controls at least one of the speed and steering of the host vehicle M on the basis of the target trajectory TR which is output by the target trajectory generation unit 146 (step S218). This concludes the processing of the present flowchart.

According to the second embodiment described above, the automated driving control device 100 calculates the risk area RA in both the first range and the second range. The automated driving control device 100 inputs the risk area RA of the first range to the rule-based model MDL1, and inputs the risk area RA of the second range to the DNN model MDL2. The automated driving control device 100 selects the optimum target trajectory TR from the target trajectory TR which is output by each of the rule-based model MDL1 and the DNN model MDL2. The automated driving control device 100 controls at least one of the speed and steering of the host vehicle M on the basis of the selected target trajectory TR. As a result, similarly to the first embodiment, it is possible to smoothly control driving of the host vehicle M.

Other Embodiments (Modification Examples)

Hereinafter, other embodiments (modification examples) will be described. In the first embodiment or the second embodiment described above, a case where one or more the rule-based models MDL1 and one or more DNN models MDL2 are included in a plurality of models that can be selected by the target trajectory generation unit 146 has been described, but there is no limitation thereto. For example, a model created on the basis of a method called model-based or model-based design (hereinafter referred to as a model-based model) may be included among a plurality of models. The model-based model is a model for deciding (or outputting) the target trajectory TR in accordance with the risk area RA by using an optimization method such as model predictive control (MPC). The model-based model is another example of the "first model."

Among the plurality of models, various models implemented by machine learning such as a binary tree-type model, a game tree-type model, a model in which low-layer neural networks are interconnected like a Boltzmann machine, a reinforcement learning model, or a deep reinforcement learning model may be included. A binary tree-type model, a game tree-type model, a model in which low-layer neural networks are interconnected like a Boltzmann machine, a reinforcement learning model, a deep reinforcement learning model, or the like is another example of the "second model."

For example, in a case where the driving mode is the second automated driving mode or the first automated driving mode in which the level of automation is lower than that in the second automated driving mode, the target trajectory generation unit 146 may select a model-based model from a plurality of models. In a case where the driving mode is the third automated driving mode or another automated driving mode in which the level of automation is higher than that in the third automated driving mode, the target trajectory generation unit 146 may select a machine learning model such as a binary tree-type model or a game tree-type model. In a case where the model-based model is selected by the target trajectory generation unit 146, the risk area calculation unit 144 may set the range of the risk area RA to the first range greater than the second range similarly to when the rule-based model MDL1 is selected. In a case where the binary tree-type model, the game tree-type model, or the like is selected by the target trajectory generation unit 146, the risk area calculation unit 144 may set the range of the risk area RA to the second range smaller than the first range similarly to when the DNN model MDL2 is selected.

[Hardware Configuration]

Figure 19:
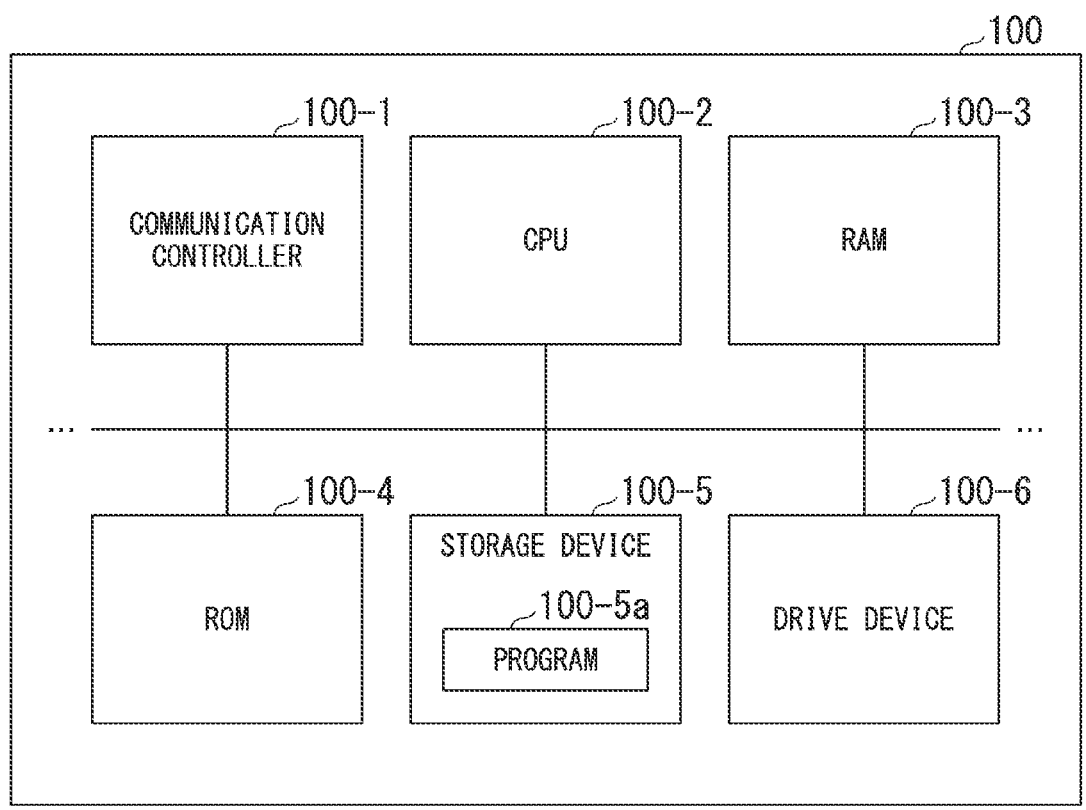
FIG. 19 is a diagram illustrating an example of a hardware configuration of the automated driving control device of the embodiment.

FIG. 19 is a diagram illustrating an example of a hardware configuration of the automated driving control device 100 of the embodiment. As shown in the drawing, the automated driving control device 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving control device 100. The storage device 100-5 stores a program 100-5a which is executed by the CPU 100-2. This program is developed into the RAM 100-3 by a direct memory access (DMA) controller (not shown) or the like, and is executed by the CPU 100-2.

Thereby, some or all of the first control unit, the second control unit 160, and the third control unit 170 are realized.

The above-described embodiment can be represented as follows.

A vehicle control device including:
at least one or more memories having a program stored therein; and
at least one or more processors,
wherein the processor executes the program, to thereby
recognize an object which is located near a vehicle,
calculate an area of risk which is distributed around the recognized object,
generate a target trajectory for the vehicle to travel along on the basis of the calculated area,
control at least one of a speed or steering of the vehicle on the basis of the generated target trajectory,
select one or a plurality of models from a plurality of models that output the target trajectory in a case where the area is input,
input the calculated area to the selected model,
generate the target trajectory on the basis of an output result of the model to which the area is input, and
change a range of the area in accordance with a type of the selected model.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control method comprising:
recognizing an object which is located near the vehicle;
calculating an area of risk which is distributed around the recognized object;
generating a target trajectory for the vehicle to travel along on the basis of the area of risk;
controlling at least one of a speed or steering of the vehicle on the basis of the generated target trajectory;
selecting one or a plurality of models from a plurality of models that output the target trajectory in a case where the area of risk is input, input the area of risk to the selected model, and generate the target trajectory on the basis of an output result of the model to which the area of risk is input; and
changing a size of a range of the area of risk to a different size in accordance with a type of the selected model among the plurality of models,
wherein the plurality of models include at least one first model which is rule-based or model-based and at least one second model which is machine-learning-based, and
wherein the range of the area of risk is set to a first range in a case where the model selected is the first model, the range of the area of risk is set to a second range smaller than the first range in a case where the model selected is the second model, and calculating a potential of the risk within the set range.

2. A vehicle control device comprising:
a processor configured to:
recognize an object which is located near a vehicle;
calculate an area of risk which is distributed around the object;
generate a target trajectory for the vehicle to travel along on the basis of the area of risk;
automatically control at least one of a speed or steering of the vehicle on the basis of the target trajectory;
select one or a plurality of models from a plurality of models that output the target trajectory in a case where the area of risk is input, input the area of risk to the selected model, and generate the target trajectory on the basis of an output result of the model to which the area of risk is input; and
change a size of a range of the area of risk to a different size in accordance with a type of model among the plurality of models,
wherein the plurality of models include at least one first model which is rule-based or model-based and at least one second model which is machine-learning-based, and
wherein, the processor is further configured to set the range of the area of risk to a first range in a case where the model selected is the first model, set the range of the area of risk to a second range smaller than the first range in a case where the model selected is the second model, and calculate a potential of the risk within the set range.

3. The vehicle control device according to claim 2, wherein the processor is further configured to select any one model from the plurality of models in accordance with a type of road on which the vehicle travels.

4. The vehicle control device according to claim 3, wherein the processor is further configured to select the first model in a case where the vehicle travels on an expressway, and select the second model in a case where the vehicle travels on a road with more obstacles than an expressway, has a complicated surrounding situation, or a road with unrecognizable lanes.

5. The vehicle control device according to claim 2, wherein the processor is further configured to select any one model from the plurality of models in accordance with a level of automation when at least one of the speed or steering of the vehicle is controlled automatically.

6. The vehicle control device according to claim 5, wherein the processor is further configured to select the first model in a case where the level is equal to or higher than a reference value, and select the second model in a case where the level is lower than the reference value.

7. The vehicle control device according to claim 2, wherein the processor is further configured to input the area of risk to each of the plurality of models, generate a plurality of target trajectories on the basis of an output result of each of the plurality of models to which the area of risk is input, and the target trajectory closest to a trajectory when a person drives the vehicle or another vehicle from the plurality of generated target trajectories, and
control at least one of the speed or steering of the vehicle on the basis of the target trajectory.

8. The vehicle control device according to claim 2, wherein the area of risk is an area partitioned by a plurality of meshes,
the potential of the risk calculated on the basis of a state of at least one of the vehicle or the object is associated with each of the plurality of meshes,
the potential of the risk associated with each of the plurality of meshes is normalized on the basis of potentials of all meshes included in the area of risk to generate a normalized potential, and the processor is further configured to generate a trajectory passing through the mesh of which the normalized potential is lower than a threshold as the target trajectory.

9. A computer readable non-transitory storage medium having a program stored therein, the program causing a computer mounted in a vehicle to execute:
recognizing an object which is located near the vehicle;
calculating an area of risk which is distributed around the recognized object;
generating a target trajectory for the vehicle to travel along on the basis of the area of risk;
controlling at least one of a speed or steering of the vehicle on the basis of the generated target trajectory;
selecting one or a plurality of models from a plurality of models that output the target trajectory in a case where the area of risk is input, inputting the area of risk to the selected model, and generating the target trajectory on the basis of an output result of the model to which the area of risk is input; and
changing a size of a range of the area of risk to a different size in accordance with a type of the selected model among the plurality of models,
wherein the plurality of models include at least one first model which is rule-based or model-based and at least one second model which is machine-learning-based, and
wherein the range of the area of risk is set to a first range in a case where the model selected is the first model, the range of the area of risk is set to a second range smaller than the first range in a case where the model selected is the second model, and calculating a potential of the risk within the set range.

* * * * *